US008760030B2

(12) United States Patent  
Ross et al.

(10) Patent No.: US 8,760,030 B2  
(45) Date of Patent: Jun. 24, 2014

(54) FLEXIBLE ROTOR SEQUENTIALLY ACTUATED MOTOR/GENERATOR

(76) Inventors: David A. Ross, Stone Mountain, GA (US); Emik A. Avakian, Chicopee, MA (US)

(*) Notice: Subject to any disclaimer, the term of this patent is extended or adjusted under 35 U.S.C. 154(b) by 462 days.

(21) Appl. No.: 13/151,522

(22) Filed: Jun. 2, 2011

(65) Prior Publication Data

US 2011/0298310 A1 Dec. 8, 2011

Related U.S. Application Data

(60) Provisional application No. 61/351,987, filed on Jun. 7, 2010.

(51) Int. Cl.
| | |
|---|---|
| H02K 1/22 | (2006.01) |
| H02K 7/10 | (2006.01) |
| H02K 21/12 | (2006.01) |
| H02K 21/24 | (2006.01) |

(52) U.S. Cl.
USPC .............. 310/261.1; 310/80; 310/156.16; 310/156.37

(58) Field of Classification Search
CPC ................................. H02K 21/22; H02K 7/10
USPC ........ 310/20, 37, 80, 156.16, 156.17, 156.24, 310/156.37, 261.1
See application file for complete search history.

(56) References Cited

U.S. PATENT DOCUMENTS

| 2007/0228860 A1* | 10/2007 | Rao ........................... 310/156.37 |
| 2008/0048530 A1* | 2/2008 | Peng et al. .................. 310/67 A |

* cited by examiner

*Primary Examiner* — Tran Nguyen
*Assistant Examiner* — Jose Gonzalez Quinones
(74) *Attorney, Agent, or Firm* — Alix, Yale & Ristas, LLP

(57) ABSTRACT

This motor/generator produces rotational torque and/or electrical energy employing a flexible magnetically permeable circular band as a rotor that in operation is in physical contact with the stator, arching and curving forward in response to advancing magnetic fields along the stator surface. The stator may be comprised of either a typical three-phase winding, or a series of magnetic actuators arranged in a toroid for which the rotor band acts as a continuous armature. The rotor rotates as follows: an actuator to the left or right of an active actuator is activated to pull a rotor arch down to the stator surface; as this occurs, the previously active actuator is turned off and that part of the rotor springs away; the rotor moves clockwise or counterclockwise as the arches of the rotor are advanced forward or backward, respectively. Differential rotor movement provides speed reduction and torque enhancement without gears.

10 Claims, 10 Drawing Sheets

FLEXIBLE ROTOR SEQUENTIALLY ACTUATED MOTOR/GENERATOR

CROSS-REFERENCE TO RELATED APPLICATION

This application claims the priority of U.S. Provisional Patent Application No. 61/351,987 filed Jun. 7, 2010, the disclosure of which is incorporated herein in its entirety.

BACKGROUND OF THE INVENTION

1. Field of the Invention

This patent discloses a completely new category of rotary systems, motors and generators. The disclosed invention employs highly-integrated innovations cutting across multiple fields of innovations, including: magnetic actuators, electromagnetic rotary machines (specifically variable reluctance motors and generators), gear (speed) reduction/torque enhancement systems, electronic controllers, power circuitry, feedback control systems, and fully-integrated drive systems. This invention is indeed a system where everything from the controller to the wheel, or central shaft, is integrated into a single device to maximize efficiency while minimizing weight, size and cost. This integration across multiple fields of innovation blurs the lines between controller, motor, speed-reduction/torque enhancement system and wheel (or shaft), with motor components being used as controller components, speed-reduction/torque enhancement components, and as a wheel rim or other uses for a revolving element.

However, first and foremost, the invention belongs within the combined fields of magnetic actuators and electromagnetic rotary machines. Where the invention is a hybrid of the basic components of each: actuators and armatures typical of actuated devices, as well as a stator and rotor typical of a rotary device. The actuators of this invention form the circular structure of a stator, and the armatures associated with these actuators are merged into a single continuous flexible circular band of high magnetic permeability that acts as a rotor.

2. Prior Art

Alfred Kreidler [1], FIG. 4, is perhaps the closest prior art to the actuators employed in the herein disclosed motor/generator. [1] Shows a curved actuator surface 13 and continuous rolling armature 14 with a spring 11 to "spring" the armature away from the actuator surface when the actuator turns off.

The actuators of the herein disclosed invention do have a curved surface, and the armature does curve to conform with that surface when the actuator is activated; further, the armature of the disclosed invention does spring away from the actuator when the actuator is turned off. However, the disclosed invention differs as follows: it employs multiple actuators with curved surfaces placed side-by-side to form a complete circle; employs a single circular band that acts as a single armature for all the actuators; employs an armature that is flexible and only in this way is able to conform to the curvature of the actuator surfaces; employs an armature that has its own efficient spring characteristic, thus eliminating the need for an external spring; and most importantly, mechanically links the continuous rolling motion of the armature to a surrounding rim or central shaft, therefore the disclosed actuators can never function separately but must be synchronized with each other.

Electromagnetic Rotary Machines (Motors and Generators)

Michael Faraday designed and constructed the first electric motor in 1821, [2]. Since then, many types of electromagnetic rotary machines have been developed using the principles of magnetic fields and what is empirically know about magnetic materials: permanent magnets and magnetically permeable materials. There are many types of motors that employ electromotive forces: DC, AC, synchronous, field effect or induction motors, permanent magnet, hysteresis and switched reluctance, [3]. All electric motors consist of a stator, which remains stationary, and a rotor that turns either within or about a stator. The stator is comprised of electromagnetic circuits that can be switched on and off as appropriate to propel the rotor. The rotor is comprised of either: permanent magnets, semi-permanent magnets (as in the hysteresis motor), electromagnets, self-induction elements (induction motor) or permeable magnetic materials (switched reluctance motor) [5]. The switched reluctance motor is unique, as it is the only type of motor that employs a "passive" rotor—a rotor without any magnetic poles. Instead the rotor of reluctance motor acts to complete the magnetic circuit between magnetic poles produced in the stator.

In every case, the purpose is to employ magnetic fields to produce forces tangent to the direction of rotation of the rotor surface that cause the rotor to turn. The electromagnetic fields produced by the stator are switched on and off, or otherwise cycled (e.g., with the application of phased alternating electrical currents) in such a fashion that the attractive and repelling fields produced by the stator move around the stator surface so as to continue to apply tangential forces to the rotor. Finally, there is always an air gap between the rotor and stator the size of which limits the magnitude of the tangential forces produced—the amount of force applied to the rotor that makes it turn. This air gap must be mechanically maintained and supported so that the moving rotor cannot contact the stator surface, which would damage the motor in all existing designs.

Ten years after Michael Faraday developed the first motor a crude generator, and the first alternating current generator that could be put to practical use was developed by a Belgian-French inventor by the name of Zenobe Theophile Gramme in 1867; the same Gramme developed a direct current generator in 1869.

Within the above-described field of electromagnetic machines (motors and generators), the switched reluctance (SR), sometimes called variable reluctance (VR), machine is prior art most closely associated to the disclosed invention. The SR machine can be operated as either a motor or a generator. The SR machine does not use either permanent magnets or electromagnets in the rotor to create attractive and repelling forces to move the rotor. Instead, the rotor of a switched reluctance motor is passive, employing highly permeable magnetic material that acts as a magnetic conduit to link salient north and south electromagnetic stator poles. While in most SR motors, the rotor is comprised of salient "poles;" again, these are passive (not being magnetized as either north or south magnetic poles) and are physically spaced such that torque to turn the rotor is created as the rotor poles are pulled by magnetic forces of attraction into alignment with north and south electro-magnetic poles created by the stator windings. This is called a "switched" reluctance motor because as soon as the salient poles of the rotor come into alignment with one set of electromagnetic north and south poles of the stator (a low reluctance state), those poles are switched off and a neighboring set of north/south poles in sequence around the stator surface is switched on (a high reluctance state), and the rotor is attracted forward toward those poles, etc.

The herein disclosed invention differs from existing SR motor art in five fundamental ways. First, unlike any existing SR motor, the rotor of our invention has no salient poles.

Instead the rotor of the invention is a perfectly smooth band of highly permeable material. Second, the rotor of the invention is flexible and continuously changing shape as the motor runs; whereas SR rotors are rigid and does not change their shape. Third, in operation the flexible rotor of the disclosed invention is pulled into contact with the stator surface and is "force wrapped" forward (or backward) along the stator surface, whereas the rotor of a SR motor (or any other electric motor) never contacts the stator surface. Fourth, unlike any other motor (SR, or otherwise), the invention employs radial forces—the forces of attraction between the rotor and stator—as the primary motive force to turn the rotor; all other motors employ forces tangent to the direction of rotor rotation. Fifth, unlike any rotor of any other motor, the forward (or backward) "force wrap" movement of the flexible rotor around the stator acts as a differential speed-reduction/torque-multiplying mechanism, lowering output speed and increasing output torque. This is a discovery that the inventors made and used with elements for a given purpose therefore it can be given a claim at no cost thus there can be a "gearing" at no cost and no additional weight.

Gear Reduction Systems/Drive Trains

There is a great deal of prior art for gear reduction systems and drive trains. However, the only patented invention that comes close to the type of gear reduction offered by our invention is that of Keith S. Rodaway [4]. FIGS. 1-6 of Rodaway's patent shows this mechanically complex gear reduction system. It is of a differential type utilizing a ring gear with rods on its inner circumference, and an inner gear wheel with corresponding rods that rolls around on the inside of the ring gear. The eccentric rolling motion of the inner gear wheel is made to turn a central axle via a complex mechanical linkage mechanism; further, a second ring gear and inner gear wheel must be incorporated into this design to offset the eccentric motion of the first ring-wheel pair so as to eliminate vibrations caused by their offset movements. By making the number of rods on the eccentric wheels fewer than the number of rods on the surrounding ring gear, and providing an appropriate linkage mechanism to couple the differential movement of each wheel gear to a central shaft, a very high gear reduction is achieved in a single package where the gear reduction occurs as a result of the difference in circumferences of the inner wheel and the outer ring. The patent states that for a ring with A number of rods and inner wheel gear with B number of rods, the gear ratio $$R = \frac{B}{A-B}.$$

The speed reduction/torque enhancement method offered by the herein disclosed invention does use the subtractive difference between circumferences of a stationary "ring" (stator) and a rolling element (circular rotor band). However, the disclosed invention differs considerably in construction: (1) it is mechanically simpler, and may or may not use gear rods; (2) it employs a flexible steel band (the rotor) in place of a rolling wheel; (3) this flexible steel band (the rotor) may roll around on either the outside or the inside of the "ring gear" (stator); (4) this is not a stand-alone gear-reduction mechanism, but rather a fully integrated part of the disclosed motor/generator; and (5) instead of employing a second rotor to counterbalance off-center rolling movement, the motion of the flex rotor is balanced by bending the rotor such that it rolls along opposing symmetrical sections of the "ring gear" (stator)—magnetic stator forces are used to bend and hold the flexible rotor in specific positions such that it maintains a concentric balanced shape at all times. However, like the mechanism of Rodaway's patent, this invention can be realized employing various speed reduction ratios, and a modified version of Rodaway's gear reduction ratio employed, as the flex rotor design does not employ gear rods in all its embodiments. For full details see "Disclosure of the Elements of the System: Differential Speed-Reduction/Torque-Enhancement Embodiments;" and the Appendix for a derivation of the gear reduction equation for the flex rotor motor.

With regard to drive train mechanisms, prior art for drive trains is abundant, but none come close to suggesting the simple, fully-integrated drive train embodiments of the disclosed invention whereby differential rotor movement is mechanically linked to either a surrounding wheel rim, or to a central shaft. For details of the drive train mechanism, see "Disclosure of the Elements of the System/Integrated Drive Train Mechanism Embodiments."

The disclosed method of quickly and efficiently transferring electrical current from one stator winding to the next in sequence around the stator herein called "current forwarding" is explained in detail in the section titled "Current Forwarding."

SUMMARY

Briefly stated, a rotary apparatus for an electric motor or a generator each having a rotor and a stator with a working surface employs a flexible rotor. The flexible rotor is a spring-like magnetic permeable band that circumscribes the working surface of the stator. The stator has sets of stator windings. The flexible rotor differs in circumference from the stator surface that it circumscribes and has a smaller circumference than the stator circumference when the working stator surface facing the rotor is concave and a larger circumference than the stator circumference when the working stator surface facing the rotor is convex. When current is directed through sets of stator windings to produce magnetic poles at equally spaced locations around the stator surface, regions of the flexible rotor closest to these magnetic poles are attracted to and brought into solid contact with the stator surface, and each region of the flexible rotor between the contact location springs away from and forms an arch above the stator surface as a result of the difference in rotor and stator circumferences. When stator windings are driven in typical motor operation fashion by either an alternating current source or switching circuitry to advance the location of the stator electric poles forwardly around the circumference of the stator, regions of the rotor stator contact move forwardly around the stator surface following the advancing positions of the magnetic poles and the flexible rotor is force-wrapped around the stator circumference. As the rotor is force-wrapped around the stator, the rotor and stator circumferences difference causes all points of the rotor to rotate about center by an incremental amount proportional to the circumference difference between the rotor and the stator. A flexible rotor motor is produced by mechanically linking movement of the flexible rotor to either a surrounding wheel or a central rotating shaft, or a flexible rotor generator is produced by injecting a small seed current into stator windings to attract the flexible rotor to the stator surface, then mechanical forces are applied to separate the rotor from the stator surface and convert the applied mechanical energy to increased magnetic field energy associated with the stator winding, and then the increased magnetic energy is harvested from the stator windings, converting the magnetic field energy to electrical energy.

The flexible rotor is magnetically force-wrapped around the stator surface to provide a gearing ratio for the flexible rotor motor/generator. The gearing ratio defined as the speed at which points in the body of the flexible rotor rotate around the center of the rotary machine to the speed of rotation of the rotator stator magnetic contact regions that force-wrap the flexible rotor around the circumference of the stator. When either a central rotating shaft or surrounding wheel is mechanically tied to points on the body of the flexible rotor, then the shaft or wheel rotates according to the gearing ratio. The gearing ratio is a function of the rotor and stator circumferences difference. The rotor circumference and is equal to 1 minus the rotor and stator circumferences difference divided by the rotor circumference.

An electromagnetic stator has a working surface that employs a ring-of-actuator stator structure for a flexible rotor. The stator has windings and comprises a three-sided channel to which are placed magnetic actuators containing soft iron or other magnetically permeable laminate. The stator actuators are each capable of independently creating magnetic poles with the force needed to attract and bring the flexible rotor into solid contact with the working surface of the stator. The ring-of-actuators stator structure completely surrounds the stator windings with magnetic iron so that electric current flowing in every part of the windings contribute to the production of the magnetic forces that move the rotor forward and/or produce electrical output. The magnetic flux pulses are very short so as to minimize magnetic reluctance losses. The structure of the actuators creates three dimensional flux paths that flow in planes both transverse and parallel to the direction of motor rotation to provide paths for magnetic forces to attract the rotor to the stator. Permeable magnetic material is placed between actuators to provide a magnetic link between actuators. The magnetic link is used to move magnetic fields smoothly forward from one actuator to the next. Each actuator is comprised of a winding having a plurality of sides including working sides that face the rotor and magnetically permeable material that surrounds the winding on all sides of the working side. All of the actuators are placed into a toroidal support structure at equally spaced intervals so that each actuator forms a part of the working structure of the stator. The flexible rotor acts as an armature that is pulled toward an actuator when it is actuated. The rotor acts as a continuous armature for the ring-of-actuators stator.

The ring-of-actuators stator structure is comprised of at least two subsets of actuators wherein actuators within a subset are wired together or otherwise connected so that each actuator within the subset is turned on at the same time by control circuitry. Each subset of actuators is comprised of two or more pairs of actuators spaced at equal distances from each other around the circumference of the stator, and every subset contains the same number of actuators which is equal to the number of locations around the stator where the flexible rotor is held against the stator surface by magnetic points at any point in time during motor or generator operation. The actuators belonging to different subsets are arranged in an alternating sequence around the circumference of the stator.

A process for quickly injecting electrical current into sequential actuator winding sets of a ring-of-actuators stator uses a flexible rotor to shorten the length of the time required to inject high levels of electrical current into sequential actuator findings so that high levels of torque output can be maintained as motor speed increases and to conserve the magnetic field energy stored in active actuators when those actuators are turned off. The rotor into a position where it creates a common flux path linkage between neighboring actuators. In the position, a temporary transformer-like mechanism is formed by which one actuator winding can be used to induce current in its neighboring actuator winding. Path linkages are created between sets of actuator windings by its multiple regions of contact with the stator when the rotor is wrapped into a position where each region of rotor stator contact is centered between an actuator belonging to the current set of active actuators and the neighboring actuator that is a member of the next set of actuators to be turned on. In the position, the multiple regions of rotor stator contact are centered and in full contact with the magnetically permeable material placed between neighboring actuator windings. Flux paths are established when the multiple contact regions of the rotor are in the position. The flux paths flow from the center poles of neighboring actuator windings into and through the rotor to the magnetically permeable material positioned between these neighboring actuator windings and then between actuator permeable material back under the windings to the center poles of each actuator. The permeable material located between the neighboring pairs of actuators provides a common flux path between the magnetic fields of these neighboring actuators. A temporary transformer-like linkage of the common flux paths is created between these pairs of neighboring actuator windings. The transformer-like linkage follows the rule that the amount of magnetic flux flowing through the common flux path equals the sum of the flux produced by electrical current flowing in each of the neighboring actuator windings. When current decreases in one winding, it increases in the other to maintain the amount of flux flowing through the common flux path. The number of windings for each actuator is identical so that when the current flowing through one actuator winding decreases, then the current in the paired actuator winding must increase in equal amount. When the amount of electrical current flowing in one actuator winding of an actuator pair is reduced to zero by turning off that actuator, then current in the other actuator winding of that pair must increase by an equal amount, effectively forwarding current from one actuator to the next. The temporary transformer-like linkage is employed and the current forwarding process is employed to conserve and maintain the magnetic field energy of the actuator being turned off so that the energy put into the magnetic field by that actuator is not lost, but is instead shifted forwardly along the stator surface to produce magnetic forces of attraction in a new location. Since very little time is required to move the existing magnetic field forward to the neighboring actuator, the motor torque output can be maintained over a larger motor speed increase because the actuators can be turned on and off at a far faster rate. Once the transformer-like linkage is used to induce electrical current in its paired actuator winding, sustaining current via connection of that actuator winding to a power source is undertaken by determining the exact location of the rotor. Power is connected to the next set of actuators in sequence when the rotor contacts with the stator is centered over the active actuators so as to roll the rotor forward in contact with a magnetic material midway between the active set of actuators and the next set of actuators in sequence. The currently active set of actuators is turned off when regions of the rotor come into contact with the magnetic material midway between the currently active actuators and the next actuators in sequence, and in so doing, transfer current immediately from the actuators being turned off into the next set of actuators in sequence being turned on.

A vastly different means of transforming electric current into rotary motion and rotary motion into electric current is disclosed. A family of embodiments which employ the same elements (a flexible rotor, a stator comprised of a circle of actuators, integral differential gear reduction, and current forwarding) is realized in a variety of mechanical configurations. Combining the elements to form the various configurations herein disclosed optimizing the design in terms of efficiency and performance to address a wide variety of uses. However, in all cases five specific phenomenon of nature are exploited: (1) direct (radial) forces of attraction between the rotor and stator rather than the less direct tangential forces of magnetic attraction employed by existing motors and generators, (2) the highly flexible and efficient spring constant of thin steel alloys with high magnetic permeability (e.g., Permendur), (3) the increased magnetic forces and efficiency of employing very short flux paths, (4) a differential arrangement of elements to provide integral speed reduction and torque enhancement in a light-weight efficient manner; at no additional cost or weight, and (5) the transformer effect that forms between stator windings when the rotor is in a position to bridge two actuators. This is a transient transformer effect that comes into play when the rotor physically contacts the stator surface between two adjacent actuators, and in so doing magnetically linking the windings of these adjacent actuators such that when one is turned off, the collapsing magnetic field of one shifts forward to the other, moving electrical current into this adjacent actuator, which is being turned on. The objective is to decrease the turn-on time of actuators and in so doing, increase the amount of torque the motor is capable of producing as motor speed increases. Thus, this is a very effective means of adding to the efficiency of the system.

The innovative technique relies on certain natural phenomenon. These phenomena are not claimed. The disclosed apparatus depends on a combination of elements that exploit the phenomena. The five phenomenon of nature described above are exploited and are used in combination with elements that have been disclosed.

The idea for this new type of motor/generator is to apply magnetic actuator design configurations to the design of rotary drive systems and generators to achieve increased output (either increased torque or increased electrical energy production) per unit weight and size while also achieving high efficiency.

A purpose is to provide a means for enhancing output and efficiency per weight and size. A fully integrated drive system/generator that uses actuator design and integrated design methods to optimize output and efficiency and occupies a circular motor is disclosed. In FIGS. 1 and 2 the motor has a diameter of about 13 inches (to the inside of the wheel rim) and a thickness of about 4.5 inches. However, this motor/generator can easily be scaled up to embodiments that would have much larger diameters and rotor/stators that are much wider so as to produce greater torque and horsepower (in a motor) and far more power for generator embodiments.

Efficiency for both motors and generators can be maintained over a very wide 1 to 4,000 speed range, with the actual range determined by the specific design. For instance a motor designed for very high torque might employ 1 in 18 differential gearing and have a specific range of 0.01 rpm to 400 rpm over which it can produce maximum torque with high (90%) efficiency.

In addition to efficiency, our motor/generator is very light-weight for the amount of torque delivered as compared with any other known drive system (controller, motor, transmission) known. This makes it ideal for "motor wheel" use, because it minimizes un-sprung wheel weight that is usually a stability/safety concern for any vehicle. Further, a novelty herein termed "current forwarding" enables this motor to produce greater torque output over this 1 to 4,000 speed range at greater efficiency than any other motor of comparable weight and size. Existing motors exhibit back electromotive forces (EMF) and motor inductance that prevent injection of the large currents needed to produce high torque at a motor's higher operating speeds.

Practical applications for the disclosed motors/generators are: the movement of vehicles such as commuter vehicles, motorcycles, bicycles, electric golf carts, electric lawn mowers, and electric utility vehicles used by maintenance crews, and forklifts both for driving the vehicle and for operating the forks, and small boats as well ships and military landing crafts, etc. It will be most useful in robotics because most of the introduced design for the FRM/G elements can be widely scaled. Power can be conserved by placing the motor at the bottom or at the rear of washers and driers (home and commercial); the efficiency, simplicity and length or height (less than 3½ inches) of the motor makes this application desirable. These novelties can use two motors to position XY tables for such applications as placing components on printed circuits and milling machines. The motors can maintain incremental movements which have different lengths from 0.0047 inches to several inches once it is commanded to do so. These lengths may be conservative in their minimal range as well as their larger range. Finally, as a generator, it could be used as a windmill turbine; a smaller or larger version can be used as an emergency generator where its simplicity and relatively light-weight will be an asset.

The disclosed motor would also be much more efficient running blower fans, and especially the NC compressor units. The compressor motors in home NC units can pull 200 amps or more, depending on the size of the unit. The disclosed motor could cut that back by 20 percent from 200 amps to 160 amps. That is a considerable savings. For example, in large southern cities in the summer the power bill can run higher than $300 a month because of the A/C power used. A 20% cut in such a bill would mean a savings of at least $60 a month or $300 over a 5-month summer. Using this motor in commercial units for buildings that draw thousands of amps of power can save the building owners considerably more.

The increase in efficiency of this new drive is realized through an integration of the overall drive system or generating system, including the internal torque multiplier design with speed reduction. Under optimal conditions existing high-efficiency motors may be able to maintain 90% efficiency at high torque over limited speed range. Further, under optimal conditions and a limited speed range, a highly efficient gear-box may also be able to maintain 90% efficiency at high torque output. Together, however, as an overall drive system the efficiency achieved under these ideal conditions is just 81% (90%×90%), thus nearly 20% of the energy expended even under ideal conditions is being wasted.

Finally, the winding inductance of traditional motors limits their ability to produce torque as speed increases, which limits their top speed, as well their ability to maintain high efficiency over a wide speed range. This problem is related to the length of time it takes current in the motor windings to increase when the winding is turned on. As speed increases, the time available for a winding to completely turn on decreases to the point that very little current can begin flowing in a winding before it must be turned off. Since torque is directly proportional to current, the amount of torque a motor can produce decreases as motor speed increases. The advantage of our motor is that it incorporates "current forwarding," a method by which a sliding transformer effect is employed to quickly move current from one actuator winding to the next using the rotor-contact surface to shift the associated magnetic field forward to the next winding. This makes it possible for our motor to operate efficiently over a wider speed range, giving it an additional efficiency advantage of from 10 to 30% over existing motors when used in vehicles that must operate efficiently over a wide speed range. This wider speed range also makes it possible to eliminate the multi-speed transmission used in most electric vehicles. Eliminating the multi-speed transmission eliminates the efficiency losses associated with those transmissions as well as reducing weight, cost and reducing the amount of space required by the drive system.

Thus, the overall advantage of our integrated motor-drive system is that its overall efficiency is in the range of 85% to 93% over a very wide torque and speed range, and this provides an overall operating efficiency improvement of from 15% to 40% over existing drive systems under real "on the road" conditions.

As a wind generator, the disclosed generator can capture between 83% and 93% of the wind energy transferred from the turning blade to the shaft without use of an intervening gearbox. The integrated generator controller automatically optimizes generator output for any shaft speed and torque input enabling this generator to capture energy from windmill shafts that other generators cannot as wind speeds diminish.

BRIEF DESCRIPTION OF DRAWINGS

The present invention may be better understood and its numerous objects and advantages become more apparent to those skilled in the art by reference to the accompanying drawings wherein like reference numerals refer to like elements in the several figures and in which.

DETAILED DESCRIPTION

General Configuration of the Motor/Generator
Disclosure of the Elements of the System
The Flexible Rotor Band The most distinguishing element of the disclosed invention is a thin, flexible circular band of highly permeable magnetic material with a spring-like characteristic that is operated within a range of it's co-efficient of elasticity for this steel alloy. A thin rotor is desirable for four reasons: (1) it greatly reduces eddy current losses that could otherwise seriously reduce the efficiency of the motor/generator, (2) it reduces the spring force required to pull the rotor against the stator, (3) it makes the rotor more efficient as a "spring" so that energy stored when bending the rotor down to the stator surface is not lost when the rotor is released and springs back to contribute to forward motion, and (4) it reduces the weight of the rotor and thus the weight of the overall drive system. The alloyed steel of the rotor of our embodiments has high tensile strength, high magnetic permeability, and a high co-efficient of elasticity; for example, the commercial product called Permendur. An alternate type of rotor band made of flexible woven steel wire of high tensile strength and efficient coefficient of elasticity is an option where a thick rotor is needed to carry the much larger magnetic fields of multi-horsepower motors and generators. This might require an additional thin but rugged (it may be slightly thicker than 0.08 inches) spring-like material.

The other elements of the invention were developed to optimize use of this flexible rotor for efficient production of high output torque and/or electrical power. The rotor band may be produced either by welding the ends of this steel alloyed band together to form a circular band, or by extrusion of a complete circular band.

Figure 1:
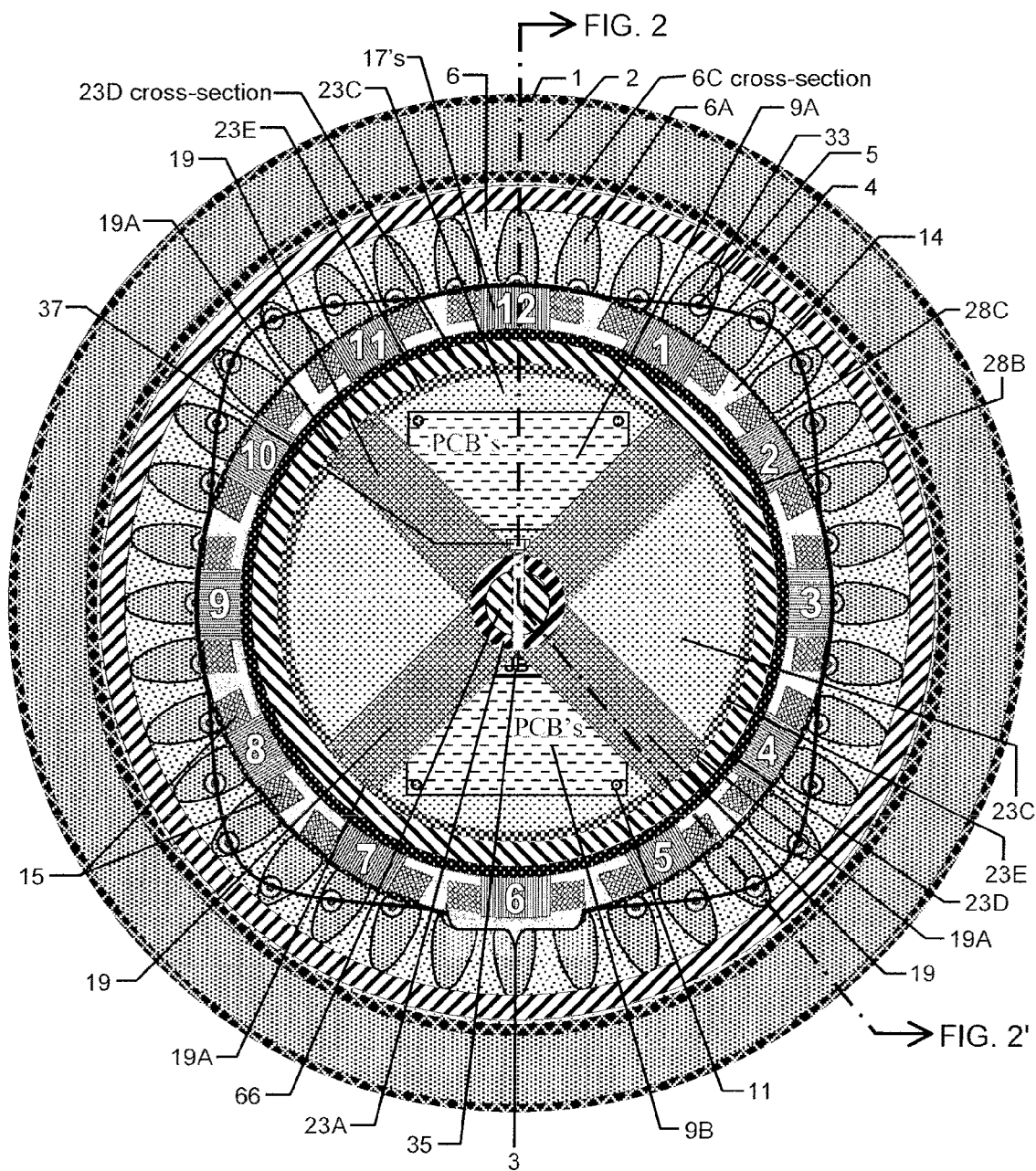
FIG. 1 is a front elevational view of a motor-wheel.
Figure 2:
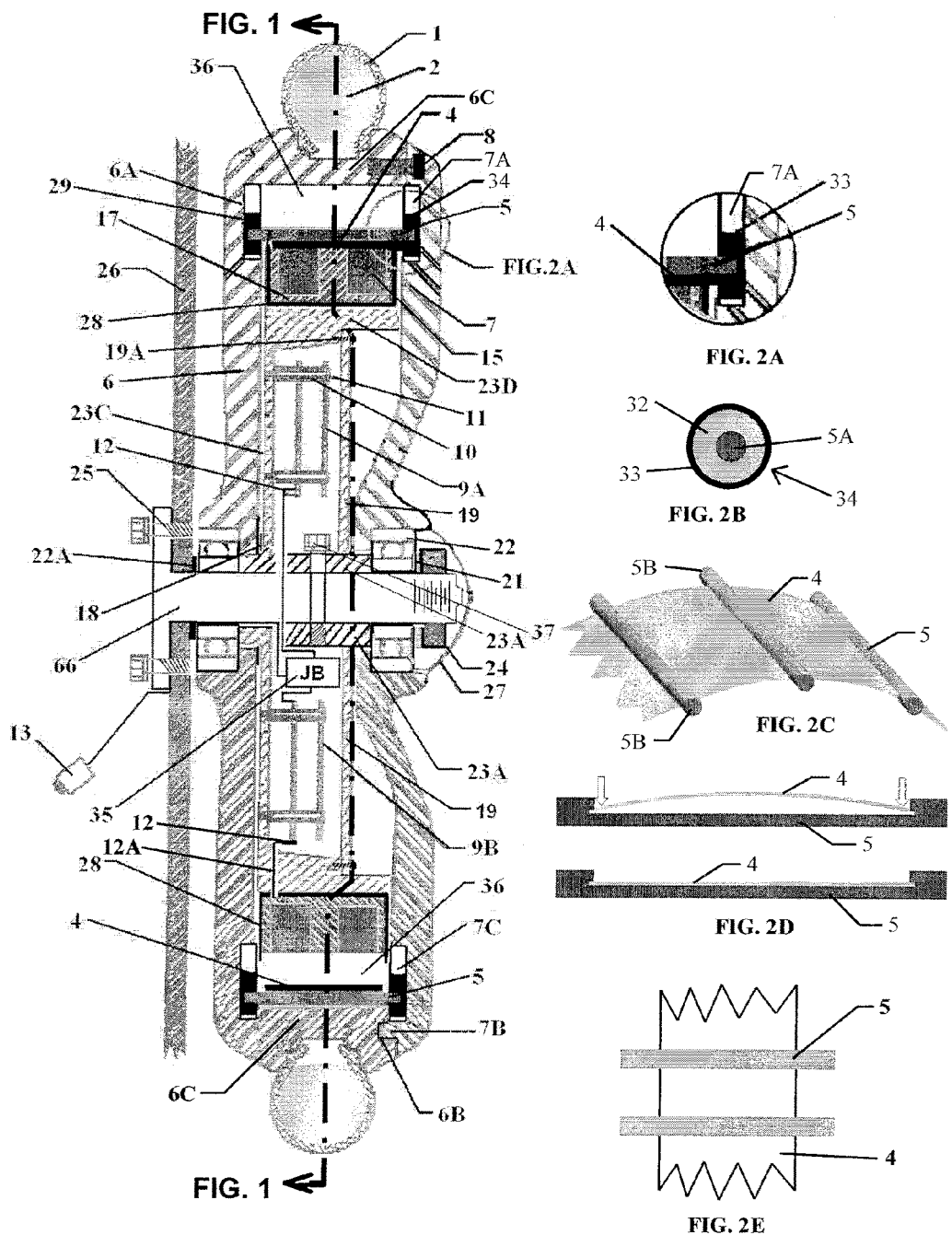
FIG. 2 is an elevational view of a cross-section of FIG. 1.

The embodiment shown in FIGS. 1 and 2 employs a 36-inch circumference rotor with a 2-inch width and 0.018 inch thickness; however, rotor dimensions should be adjusted according to the type and size motor or generator required, and thus the actual circumference and dimensions of the rotor in the other figures is left deliberately unspecified. The width of the rotor band is usually the same as the width of the stator surface, and the thickness of the rotor material is selected according to the degree to which the rotor must flex during operation, which is primarily a function of the diameter of the stator and the number of sections of the rotor that contact the stator surface. The circumference of the band is selected such that it is different from the circumference of the stator by some percentage generally in the range of 1% to 25%, depending on the desired speed reduction ratio (see Appendix: Calculating Differential Speed-Reduction Ratios at the end of the patent).

Figure 3:
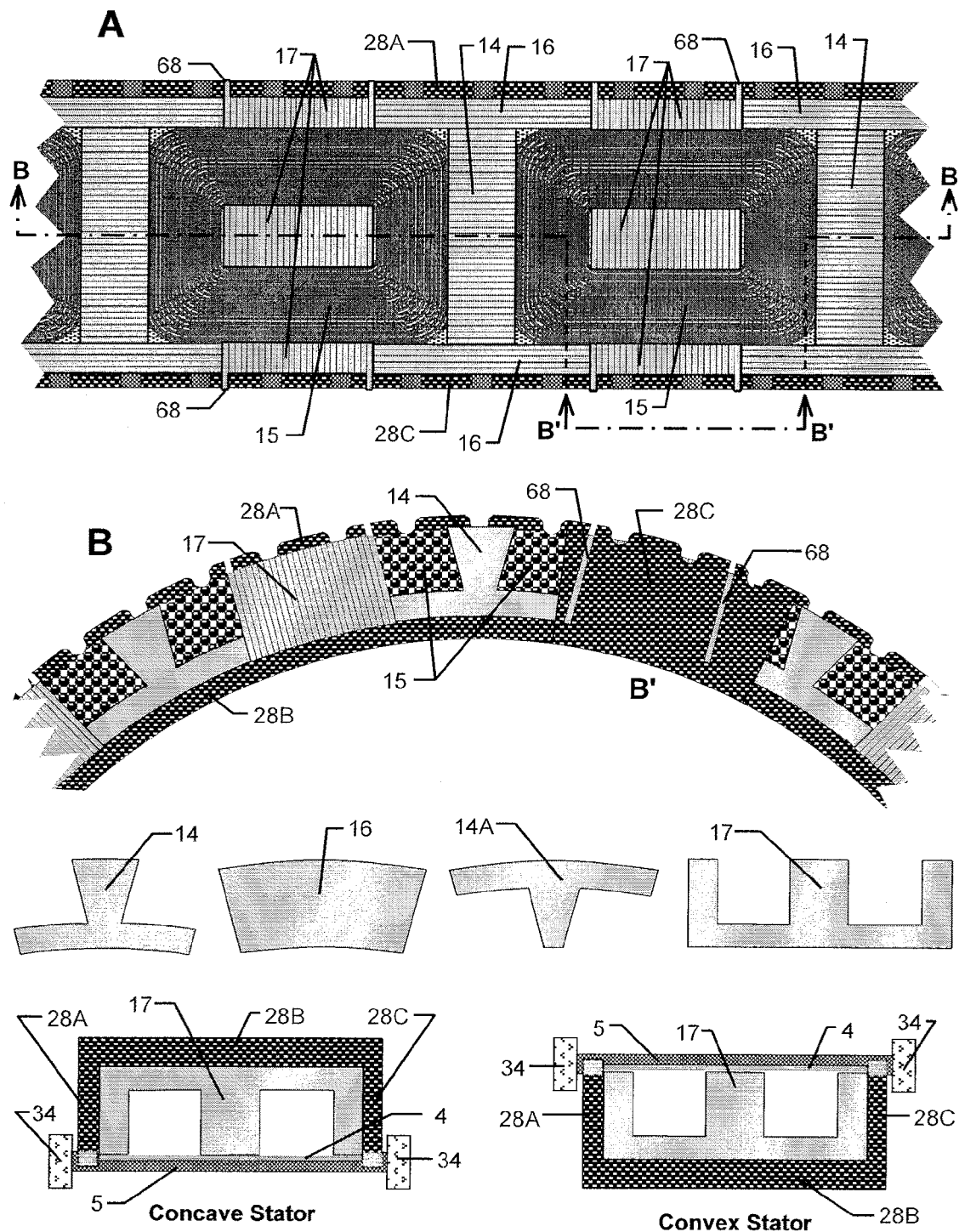
FIG. 3 preceding from top to bottom: top view of two actuators; cross-sectional view of the same at two levels; the three laminates; the cross-section of the toroidal channel with element 17 placed into slots of three elements of the toroidal channel.

In operation as motor, electromagnetic fields (north and south poles) produced by actuators comprising the stator pull sections of the flexible rotor against the stator surface. At all times it will be curving from the arch and leading edge as it enters the actuator so that this action will be most efficient. There must be at least two or more sections of the rotor pulled against the stator at all times. These sections must be equally spaced around the rotor band (as well as the stator surface), and of identical shape and size, to keep the rotor "balanced" and moving in a concentric fashion around the center of rotation of the motor/generator. We are going to, for illustrative purposes, choose 4 identical sections to hold against the stator surface and as such there are 12 total positions (the locations of each of the 12 actuators) where rotor contacts with the stator can be located; thus there will be four active actuators at any given time equally distributed among the 12 actuators encircling and comprising the stator. The stator is defined as the assembly consisting of a rigid three-sided toroidal channel 28, see FIG. 3, containing: (1) E-shaped laminates 17 with windings 15 on the central post, (2) inter-actuator laminations 14 for convex stators and 14A for concave stators, (3) windings 15 and (4) rectangular like laminates 16 to fill the remaining space so that the windings are completely surrounded by magnetically permeable laminations that capture and direct every bit of the magnetic flux produced by the windings. Each actuator 3 is comprised of laminations 17 and windings 15. Inter-actuator laminations 14 or 14A are placed between the actuators, and side laminations 16 placed, as shown in FIG. 3 filling in the space to either side of laminations 14 or 14A and the ends of neighboring actuator windings to parallel the width of the end posts of laminations 17, to: (1) magnetically tie neighboring actuator windings together for the purposes of Current Forwarding, (2) mechanically provide a continuous smooth stator surface around which the rotor can wrap, and (3) make complete use of the magnetic fields generated by the windings so that a north magnetic pole is created at the center of each actuator winding and south magnetic poles are created on all sides of each winding so that there are no "end windings" creating unused magnetic fields as is the case with many three-phase motors.

The use of inter-actuator laminations 14 or 14a for the purposes of current forwarding works as follows: when the rotor spans and touches the E-laminations of two adjacent actuators 3 and this region of contact is centered on the inter-actuator laminations 14 or 14A (see FIG. 4 T-2 illustration), a transformer effect is realized as a result of the common magnetic flux path through the inter-actuator laminations that is created between adjacent actuators when the rotor is in this position (See FIG. 4 T-2 showing both the magnetic flux F4 from one actuator and the magnetic flux F7 from the adjacent actuator flowing through the common flux path of inter-actuator laminations $14_1$). This common flux path magnetically links the adjacent actuator windings to create what is commonly called a "transformer." In this case, the transformer is a temporary one that is formed only when the rotor is in a position to provide a flux path from each of the neighboring actuators to the inter-actuator laminations between them. This temporary transformer effect makes possible the efficient and fast "forwarding" of current from one actuator that is turning off to the next actuator in sequence that is turning on as a result of the electromagnetic properties of transformers whereby flux in the common flux path must remain constant as the current in each winding changes. That is, the sum of the flux contributed by each actuator is a constant. In the case of one-to-one transformers, which is the case here, this means that the amount of current flowing in one actuator winding plus the amount of current flowing in the adjacent actuator winding of this temporary transformer must be constant. If current in one actuator winding decreases by 1 amp then current in the adjacent actuator winding must increase by one amp. This is a benefit in two ways: (1) it conserves the magnetic energy stored in each actuator when it is turned off and (2) it makes it possible to inject current into sequential actuators far more quickly than is the case in other motors. Typically, the inductance of a motor winding makes it impossible to quickly inject current into it; a problem that limits the amount of torque other motors can produce as motor speed increases. Current forwarding side-steps this problem.

The fourth and opened side of the toroidal stator channel is the functional side; that is, the side from which magnetic flux flows away from the center in the case of convex stators and toward the center for concave stators, and into the rotor from the center (north) magnetic pole of the actuators, and back down from the rotor into the actuators through the side (south) magnetic poles of actuator laminations 17 and inter-actuator laminations 14 or 14a as illustrated in FIG. 3, top drawing.

For the main motor embodiments shown in FIGS. 1 & 2, because the circumference of the rotor 4 is greater than the circumference of the stator, the four sections of the rotor not held against the stator surface bulge out and away from the stator surface to form arches. These four bulging arches are of equal size rising up and away from the stator so that the rotor maintains a well-balanced symmetrical shape at all times. For the motor of FIG. 1 with a 36-inch circumference rotor and 34-inch circumference stator, each of the four arches rising above the stator surface has a length of 5.41 inches, and the highest point of the arch is 0.654 inches away from the stator surface. The flexing of the rotor required to form arches of this dimension is not a demanding specification given the spring constant and coefficient of elasticity of, for example, Permendur. That is, the degree of flexing required in this design will not fatigue or otherwise cause the rotor material to deform or otherwise deteriorate.

The castings 6 and 7 revolve around the primary axle 66 with a flange as shown in FIG. 2. This flange is securely fixed to a given part of a frame which can be a vehicle or other type of fixed machinery. The compound axle can be seen at the left portion of FIG. 2. There is a washer slip-fit onto the primary axle until it reaches element 26. The OD of the washer is slightly less than the height of the inner race of bearing 22. Casting 6 has a central hole drilled into it to fit its bearing. The size of the hole for this bearing requires a press to have the bearing put into the hole. If this is not sufficient to securely hold the outer race in the hole, multiple small vertical bolts are threaded through the casting above it and below the bearing onto the outer race of the bearing. Before placing the bearing into the hole there is a second central and horizontal hole drilled all the way through casting 6 from the other side where the larger hole is drilled. This hole is large enough to have the secondary axle go through it to touch the inner race of the bearing. This hole is slightly smaller than the OD of the secondary axle 23A as shown in the central portion of FIG. 2. Two similar central holes are drilled into casting 7. The central width of casting 7 is wider allowing the hole for the bearing to be somewhat deeper than casting 6, so that a cosmetic cover 27 can be forced into the remaining hole for the bearing. The casting 6 with its bearing fit into the hole is now pressed by its inner race onto the primary axle until it reaches washer 22A. This is a thick compression washer or bushing separating casting 6 and the aluminum molding so that there will always be a space allowing casting 6 and 7 to smoothly rotate while the aluminum molding is kept fixed. A secondary axle is pressed onto the primary axle until it touches the inner race of the bearing in casting 6. This secondary axle is made of three parts; the first is the secondary axle itself 23A, the second part is an aluminum disc 23C and the third part is a circular shelf 23D which supports the stator. A hole or holes may be drilled in this shelf to accommodate power connections and any other wiring connections between the power and control circuit boards (upper and lower) and the stator and/or the three-sided toroidal channel fixed on the shelf. The aluminum disc 23C has a diameter which can support two sets of printed circuits above and below the two axles. The diameter is large enough so that it can become part of a circular shelf that can in turn support the fixed stator, there is an X shaped support 19 having two vertical and two horizontal strips further supporting the shelf. The X shaped support has a central hole that can be press fit onto the secondary axle and positioned to the right of a bolt designated below. The two axles have a vertical hole drilled into them such that a thread in the hole of the lower part of the secondary axle will secure the bolt. The shelf 23D has an inner circular step molded into it by which it is supported. There is a hole at the center of this X-shaped support 19 with a diameter that lends the disc being pressed onto the secondary axle. This X-shaped support also restricts the central left portion of casting 7. There is a washer placed next on the secondary axle to separate the X-shaped support 19 from casting 7 as well as keeping it in proper alignment and allowing for free movement of casting 6 and 7.

The rotor 4 is made to move forward along the stator surface by the turning-on and off of actuators 3 in sequence at the four equally-spaced locations around the stator where the rotor is held against the stator surface. The magnetic forces created by the actuators at each of these four locations pull equally-spaced sections of the flexible rotor against the stator surface and then "force wrap" the flexible rotor forward around the stator surface as one set of four actuators turn off while a neighboring set of four actuators turn on. In effect, this sequencing of actuator turn-offs and turn-ons move the four magnetic fields forward along the stator surface and in this manner (1) keeps a portion of the rotor in continuous contact with the stator surface to prevent slippage and (2) causes the rotor to wrap around the stator with a "writhen" or "wave-like" movement, of which the rotor shape of FIG. 1 can be considered a "snapshot." When used as a motor, it is important to prevent slippage of the rotor as it is wrapped around the stator because any such slippage would result in a sudden loss of motor torque—the ability to turn the wheel or shaft. For lower horsepower motors the "grip" of the magnetic field is enough to prevent slippage, but for large horsepower motors it is important to put "rods" on the rotor that lock into place on the stator support structure 28. To insure that the rotor is in constant contact with the stator surface, the turn-off of an actuator must be coordinated with the turn-on of the next in "cross-over" mode. That is, as current decreases in one actuator it must be increasing in the next actuator in sequence in equal measure so that the total magnetic force attracting the rotor to the stator remains the same during this transition. For generator embodiments, however, slippage is not a concern, and these measures need not be taken, as the primary forces applied to the rotor of a Flex Rotor Generator are orthogonal to the direction of rotation.

The lower leading edge of each rotor arch is nearest to the next actuator in sequence and will be pulled down to that actuator as the previous actuator releases its hold on the rotor. The proximity of this leading edge to the next actuator in sequence significantly contributes to the motor's efficiency and torque producing capability.

The "wrapping" of the rotor around the stator thus consists of two things occurring in careful sequence: (1) the leading edge of each of the four rotor arch sections being pulled down toward the stator surface as the next actuator in sequence begins turning on, and (2) the trailing edge of each arch springing up and away from the stator surface as the current actuator turns off. The rotor is wrapped either clockwise or counter clockwise around the stator depending on the sequencing of the actuators by the micro-controller. That is, if one set of actuators turns off while the neighboring set in a clockwise direction turns on then it indicates that the rotor is moving in the same direction as the stator. If the rotor wraps around the stator surface in a clockwise direction; and if the neighboring set of actuators turned on is in a counter-clockwise direction, then the rotor is rotating in the opposite direction but is located internal to the stator. The castings 6 & 7 supporting the surrounding wheel 1 move in the wrapping direction of the rotor due to the direct linkage of the rotor to the castings, as shown in FIG. 2 (See Linkage Description below).

Figure 7:
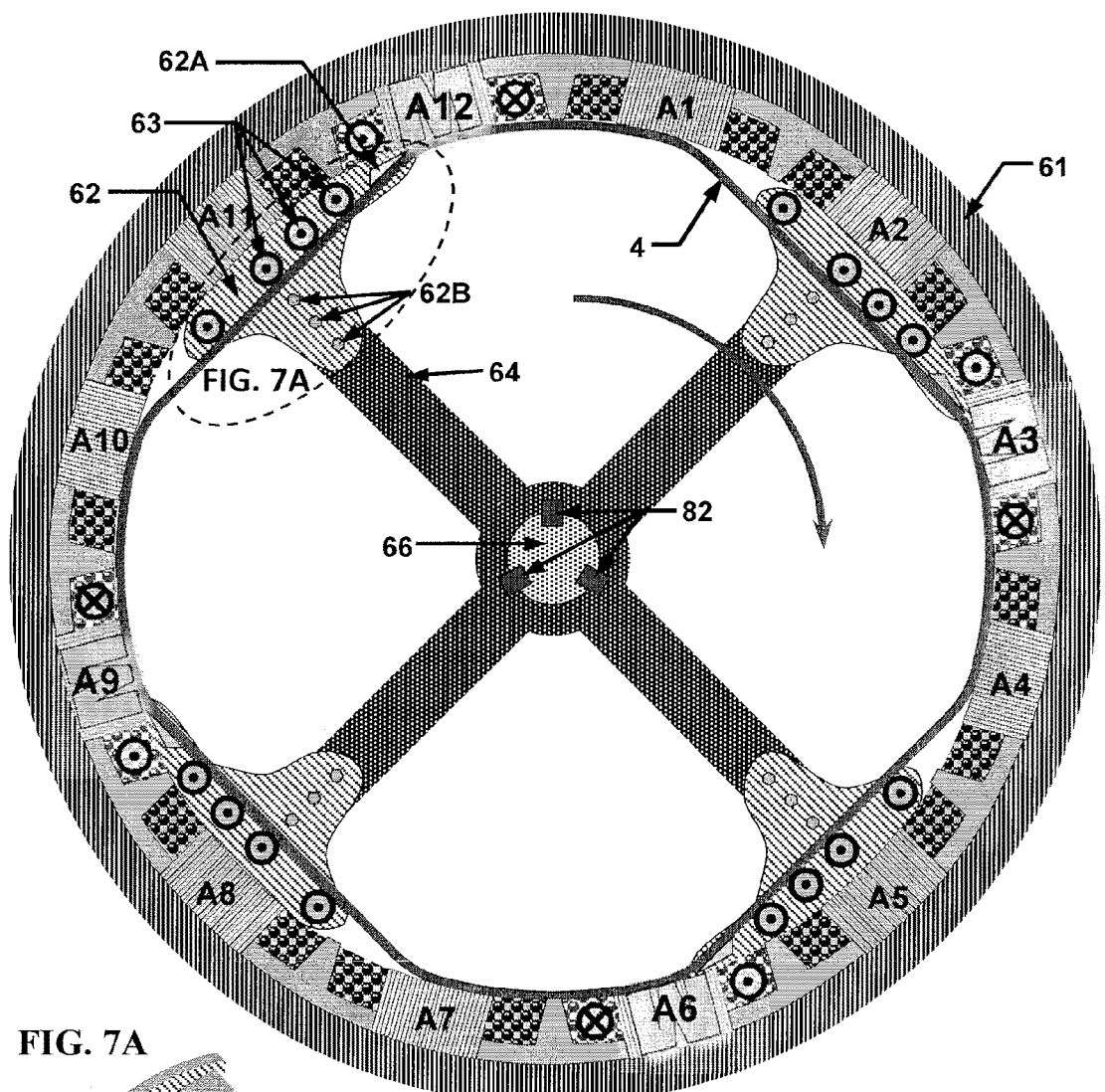
FIG. 7 is a frontal elevational view of a generator.
Figure 7A:
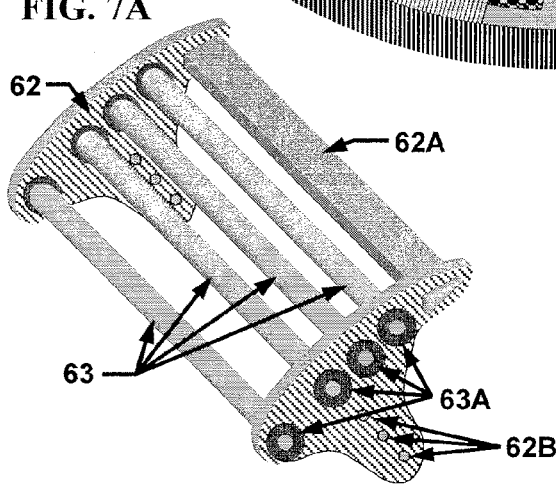

In operation solely as a generator, electromagnetic poles in the stator must still pull sections of the rotor 4 against the stator surface as described above. The only difference is that an external force must then be used to force the rotor 4 away from the stator surface at locations where magnetic fields are attracting the rotor to the stator, and in so doing to convert mechanical energy into electrical energy. FIG. 7 shows an embodiment of a flexible rotor generator with four regions of contact between the rotor and stator, with the rotor being held against the stator by electromagnetic forces at each of four locations indicated by an "M" filled with wavy lines intended to look like magnetic force. The sole purpose of the embodiment of FIG. 7 is to separate the flexible rotor from the stator surface at these locations where strong magnetic forces are holding the rotor solidly in contact with the stator surface. To perform this function, "lifter" assemblies (see FIG. 7A) are interposed between the rotor and stator in the four areas where the rotor is not being held against the stator surface. For more details on the construction and operation of this flexible rotor generator embodiment shown of FIG. 7 see the Power Generation section below.

Differential Speed-Reduction/Torque-Enhancement

Differential speed reduction is a natural result of "force-wrapping" a flexible rotor of one circumference around a stator with a different circumference. As the rotor is being "force-wrapped" around the stator, its extra length (or shortened length as the case may be) causes the rotor linkage points—points where elements 5 in FIGS. 1 & 2 attach to the rotor—to shift forward (or backward) around the stator surface relative to their starting position. Over a complete "force-wrap" cycle, the distance these linkage points shift around the stator circumference is dependent upon the difference between rotor and stator circumferences. And the speed reduction ratio is equal to this difference divided by the circumference of the rotor. The direction of the shift is "positive" (in the direction of the rotor wrapping movement) when the rotor circumference is greater than the stator circumference and "negative" (opposite the direction of the rotor wrapping movement) when rotor circumference is less than the stator circumference. The equation for calculating the gear reduction ratio is this:

$$G = \frac{R_{Circ} - S_{Circ}}{R_{Circ}} = 1 - \frac{S_{Circ}}{R_{Circ}} \qquad \text{Eq. 1}$$

where G is the gear reduction ratio, $R_{Circ}$ is the rotor circumference, and $S_{Circ}$ is the stator circumference. See the Appendix for a full derivation of this equation for flexible rotors. When $R_{Circ}$ is less than $S_{Circ}$, G is negative; indicating that the shifting motion of linkage attachment points on the rotor is opposite the wrapping direction of the rotor. This occurs when the rotor is wrapping around on the inside of the stator, as in FIG. 8.

Using Eq. 1 to calculate G for the embodiment of FIGS. 1 & 2, with $R_{Circ}$ equal to 36 inches and $S_{Circ}$ equal to 34 inches, we find the difference in circumferences ($R_{Circ}$–$S_{Circ}$) equal to 2 inches, and we divide this difference by the rotor circumference $R_{Circ}$ (36 inches) to obtain a gear reduction Ratio G of 2:36, which is 1:18. This 1:18 ratio means that rotor linkage attachment points move full circle around the stator once for every 18 wraps of the flexible rotor around the stator. For the embodiment of FIGS. 1 & 2, where the linkages 5 directly propel the surrounding wheel rim (see FIG. 11), 1:18 is the drive system gear ratio—one rotation of the wheel for every 18 wraps of the flexible rotor around the stator. This 1:18 ratio is thus equivalent to an overall drive system gear reduction ratio for a motor. Further, the inverse of G (18:1) is the torque multiplication ratio for this embodiment. This torque multiplication is a direct result of the speed reduction mechanism. Since output power is equal to the force times distance moved per second, then as speed (distance moved per second) is reduced by gearing, the output force (in this case torque) must increase by the inverse of the speed ratio. Thus, for the embodiment of FIGS. 1 & 2 with a 1:18 speed reduction, the torque is enhanced (multiplied) by a factor of 18. It is because of this natural mechanism that the flexible rotor motor is capable of efficiently producing very large torque output.

Linkage Description

To be of practical use, the flexible rotor's differential movement around the stator must be linked to either an output shaft or a surrounding wheel. The initial objective for developing the flexible rotor motor was to achieve a high torque "in-wheel" direct-drive system. Thus one element of the invention had to be linkage to a surrounding wheel, one embodiment of which is illustrated in FIGS. 1 & 2. FIG. 2 is a cross section of FIG. 1. This is shown in FIG. 1 by the two lines designated FIG. 2 and FIG. 2' and they meet at the center of the wheel. As indicated, this cross section is displayed at two different angles.

In this embodiment the prime vertical sections are the two circular castings 6 and 7 molded from high-impact plastics that appear similar to deep bowls. The configuration on the outer surface includes a groove with a standard arrangement that is used to support a tire. At their outer edges the left casting 6 and right casting 7 bend towards each other, the left one extending more toward the right and forming a horizontal section seen in FIG. 2. The castings are secured to each other by a circular groove 6b and a circular tongue 7b. They are further secured precisely by eight screws 8 which have their threads in casting 6 and their heads in casting 7 (one of these screws is shown at the upper right of FIG. 2). Together these castings form a structure that supports the internal flexible rotor 4 and the toroid constituting the stator.

FIG. 2A is an enlargement of the circle indicated in FIG. 2. FIG. 2B represents a cylindrical piece 34 designed for heavy-duty applications. It consists of: 1. a central rigid cylinder 5A, 2. tubing 32 made of elastomeric material tightly fit around the cylinder that can have different durometer and surrounding this 3. an outside ring 33 made of a self-lubricating plastic such as polytetrafluoroethylene (PTFE) generally known by its brand name Teflon. Each cylindrical piece 34 (one attached to each end of a strip or rod 5) fits into one of 36 radial guide channels 6a and 7a cut into each of the two castings 6 & 7. These strips with attached cylindrical pieces 34 fitting in the guide channels 6a and 7a, then, make up a linkage between the rotor and the castings 6 & 7, on which the wheel tire 1 is mounted (see FIG. 1). The elastomeric material could be eliminated in the cylindrical wheel 34 and replaced by nylon if the guide channels were shaped to compensate for the slight variation in the adjacent rod to rod centers and the rods 5 are maintained absolutely horizontal by these wheels. FIG. 2C indicates the strips 5 spot-welded on and above the rotor, with their centers 1 inch apart. These strips are made of rods no more than ¾ of an inch in diameter; if the rod is a half circle then it can be welded flat surface down. There will be ½ inch rods 5B spot welded to the end such that the ends will appear as full rods. This may require a jig in order to obtain a perfect cylinder. They will be the length of the width of the rotor plus 1 inch (half inch for each side of the rotor to accept the ½ inch thickness of 34). If they are magnetically permeable then they can help carry additional flux. FIG. 2D shows two rods, the top is a rod with the rotor being slid into it, the bottom shows the same rod with the center of the rotor pushed in so that the rotor is flat against the cut of the rod by spot welding the center of the rotor to the rod 5 every inch or two. FIG. 2E shows rods 5 welded above the rotor 4. This arrangement of components will serve to add strength to the rotor for high-load applications. The guide channels 6a and 7a are each cut no less than ¼ inch deep for the embodiment of FIGS. 1 & 2; their outer radial extent is greater than the peak radius of rotor arches by an amount slightly greater than the radius of a cylindrical piece 34, and the inner radial extent is below the outer circumference of the Stator by an amount slightly greater than the radius of a cylindrical piece 34. This is to accommodate the moving of the cylindrical pieces 34 up and down these guide channels as the rotor is wrapped forward (or backward) along the stator surface. The purpose of cylindrical piece 34 is to assure the horizontal position of the rotor.

The guide channels 6a and 7a are each cut no less than ¼ inch deep for the embodiment of FIGS. 1 & 2; their outer radial extent is greater than the peak radius of rotor arches by an amount slightly greater than the radius of a cylindrical piece 34, and the inner radial extent is below the outer circumference of the stator by an amount slightly greater than the radius of a cylindrical piece 34. This is to accommodate the moving of the cylindrical pieces 34 up and down these guide channels as the rotor is wrapped forward (or backward) along the stator surface.

As the motor operates, and a given set of four actuators are activated, the cylindrical pieces associated with sections of the rotor being pulled against the stator are pulled radially inward through their respective guide channels 6a & 7a. When an actuator holds a section of the rotor against the stator surface (see FIG. 1) the region of contact between rotor and stator covers a 30-degree distance—2.67 inches of the stator circumference. Therefore each time an actuator draws a section of the rotor to its surface, three rotor rods 5 with their cylindrical pieces 34 are drawn to the bottom of their respective guide channels, and the rods 5 and cylindrical pieces 34 will be held there as long as the actuator is energized. There are six rods 5 in each rotor arch between these sections of stator contact, and it is these rods with their cylindrical pieces in the arches that actually apply force to the sides of guide channels 6a and 7a to turn the wheel. As the rotor is wrapped around the stator by the sequential turn-on and turn off of actuators, the arches of excess rotor length are pushed forward, moving like a wave over the surface of the stator, lifting the rods with their cylindrical pieces up from the stator surface into an arch and then placing them back down further along the stator circumference by a distance equal to the excess arch length. For the embodiment of FIGS. 1 & 2, where the excess length of each rotor arch is one-half inch (the 2-inch excess rotor length divided by four arches), the rods with their cylindrical pieces advance by one half inch along the 32-inch stator circumference each time they are lifted into an arch and then pulled back to the stator surface. This is a distance equal to one sixty-fourth of the stator circumference, or 5.625 degrees. Thus as each passing arch "wave" lifts the rods off the stator surface and puts them back down, their respective cylindrical pieces push on the sides of the guide channels to rotate the wheel 1 by 5.625 degrees in this embodiment.

The design of rotor linkage for the Flex Rotor Motor is a challenge, as linkage points—points where the rotor rods with their cylindrical pieces push against the walls of the guide channels of the castings 6 and 7, move at varying speeds in two dimensions as the rotor wraps forward around the stator. These linkage points move toward and away from the stator surface and at the same time they move at varying speeds in a circumferential direction around the stator. In the circumferential direction the linkage points come to a complete stop where the rotor and its rods are being held against the stator surface, and at the same time there are linkage points (rods) along parts of the rotor that are springing away from the stator surface at the leading edges of the four rotor arches. Rods on these leading edges accelerate to reach their maximum circumferential speed at the peak of the rotor arches, and past this peak begin to slow. This means that the center-to-center distance between the rods will vary slightly.

This is accommodated by the elastomeric tube 32 of a given durometer in FIG. 2B. In addition, the surface of the rotor pitches forward at the leading edge, levels out at the peak of the arch, and then pitches backward on the trailing edge of the arch. The rods 5 fastened to the rotor must absorb these three types of movement while transferring the overall circumferential motion of the rotor to the surrounding wheel.

To accommodate the varying circumferential movement speeds of the rods, the width of the guide channels 6a and 7a is shaped to insure that every rod with its cylindrical piece contributes its forward movement to the rotation of the castings (and wheel). The bottom of the channels is cut wide enough to allow rods that have temporarily come to a stop against the stator surface to not impede the rotation of the castings. Moving up and away from the stator surface, the channels in the castings narrow until they are the width of the cylindrical pieces half-way up the length of the channel. When the associated rods reach this half-way point they are moving circumferentially at the average rotational speed of the rotor, which is the rotational speed of the castings and wheel, and half the speed of rods at the peaks of the rotor arches. As a rod moves past this half-way point moving its cylindrical piece toward the top of its guide channel (top of the rotor arch), the guide channel gradually widens to allow cylindrical pieces near the top of the arch to move ahead of the slower-moving ones in the middle, while still pushing against the channel side just as much as the others, so all contribute to the turning of the wheel. This is the rationale for having an elastomeric material in the component 34. However these slight changes in speed will not be sensed, they are minimal when compared to the speed of the wheel for the movement of the vehicle even at its slowest speed.

Where larger output torque may cause the rotor to slip backward on the stator surface, "U"-shaped, or half-round, cuts into which the cylindrical pieces fit are made along the top (open) edge of each side of the toroidal shell 28A and 28C that encloses three sides of the stator ring. For the embodiment of FIGS. 1 & 2, these half-round cuts are spaced at half-inch intervals around 28 so that when a passing arch-wave picks up a rod with its cylindrical piece and puts it down a half inch further around the stator, there is a half-round cut in 28A and 28C to receive the cylindrical piece 34 and prevent slippage backward of the rod and rotor. Two cylindrical guide wheels can also be seen at the bottom of FIG. 3. There are two sets of such wheels connected by rods 5.

A self-lubricating plastic such as polytetrafluoroethylene (PTFE) generally known by its brand name Teflon will coat the sliding surfaces of the sides of the guide channels 6a & 7a against which the cylindrical pieces 34 slide and apply forces that rotate castings 6 and 7. When the system of this invention is scaled up for very large torque/power output, the material of the cylindrical pieces will be such that it can conduct greater heat than Teflon and still be non-magnetic and non-conducting. Also made correspondingly deeper to accommodate this.

Other Embodiments than the Motor Wheel

Figure 8:
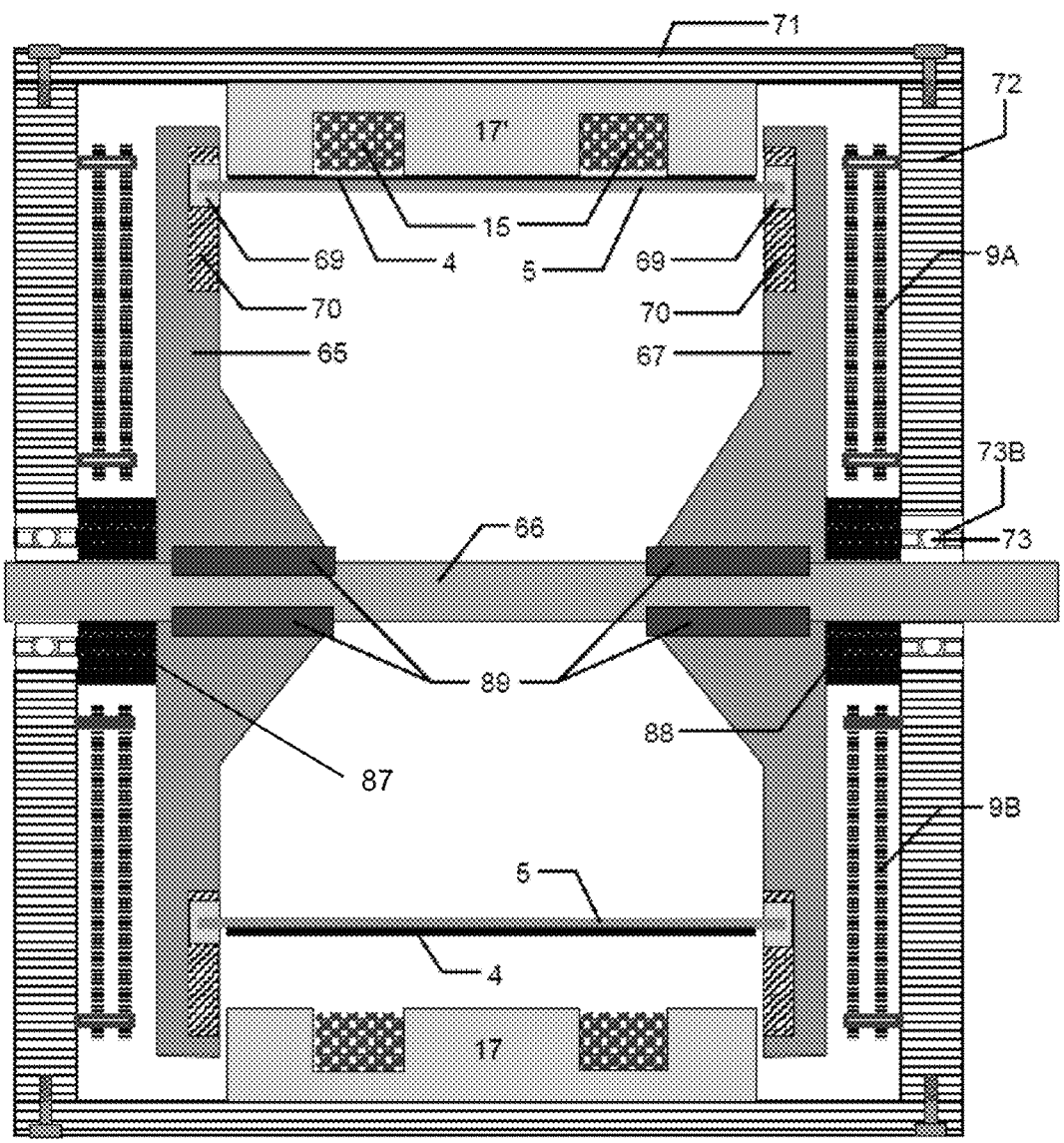
FIG. 8 is a cross-sectional view of a motor/generator with internal rotor employing differential speed reduction and rotor rod-guide channel linkage to a central shaft.
Figure 9:
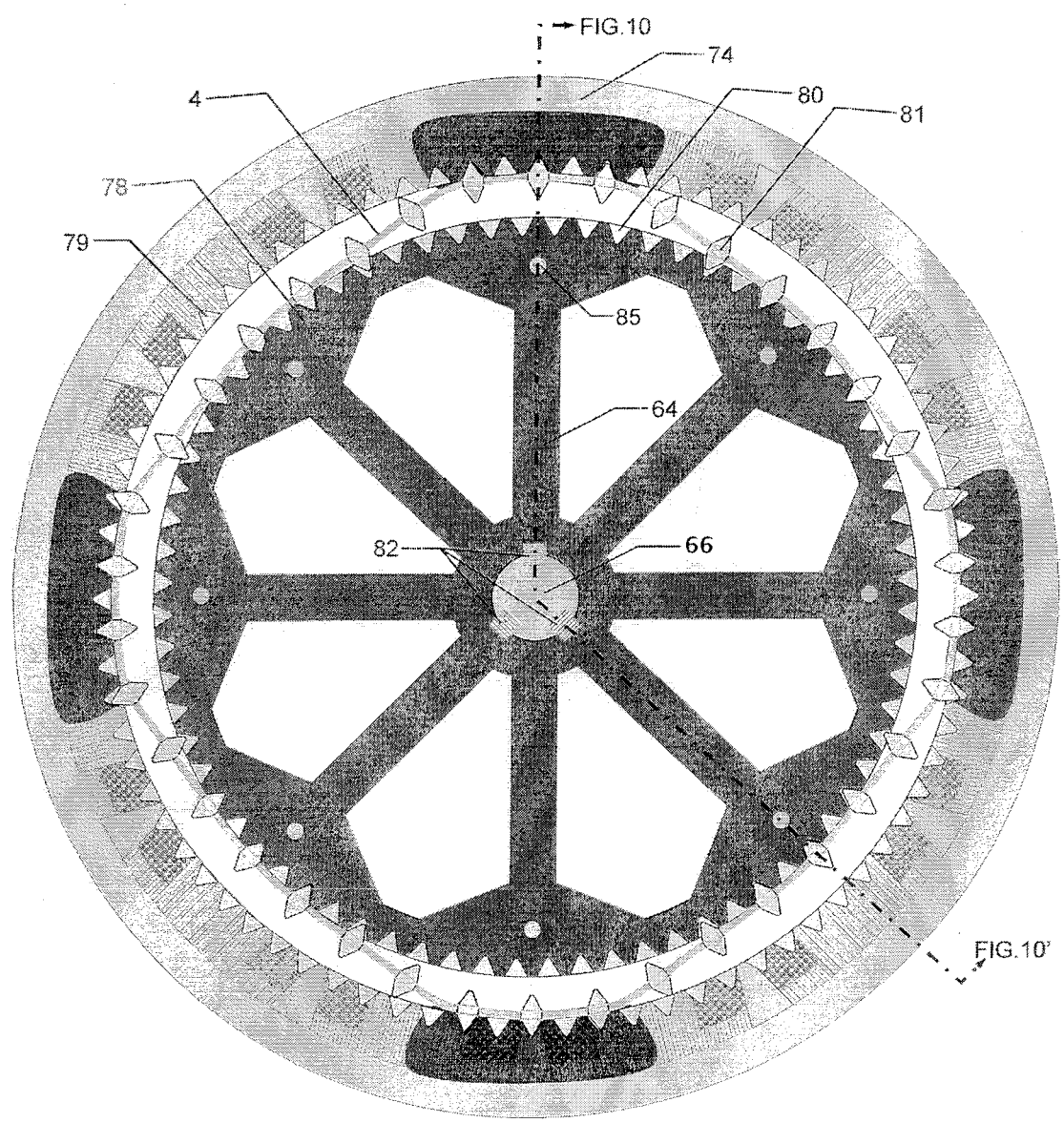
FIG. 9 is a front elevational view of a motor/generator with the rotor internal to the stator.
Figure 10:
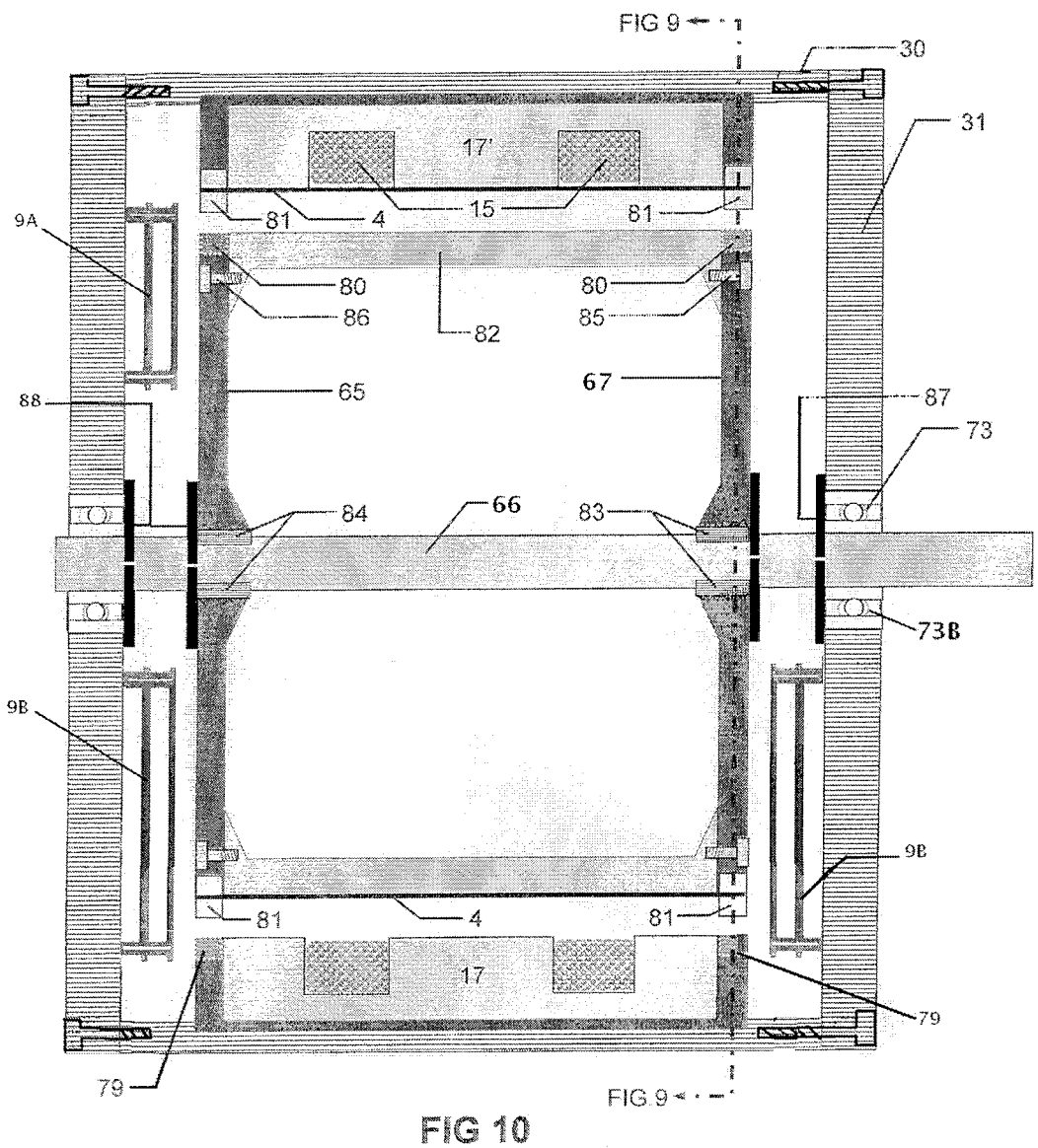
FIG. 10 is a cross-sectional view of FIG. 9 with all its elements.

Other specific embodiments of the Flex Rotor Motor are illustrated in FIGS. 7 thru 10, where FIG. 7 is the only embodiment designed specifically as a generator. FIG. 7 is also the only embodiment that does not employ differential gearing and does not employ a linkage mechanism. FIGS. 8 thru 10 can employ differential gearing and half-round rods fastened to the sides of the rotor.

In addition to the designs illustrated by these figures, the inventors claim that the primary element of the invention—the flexible rotor—can, along with the design of efficient linkage, improve the performance of many existing rotary machines; in particular: three-phase synchronous machines as well as switched reluctance machines. To make use of a flexible rotor in one of these existing machines the existing rotor would be replaced with a flexible rotor of suitable size that differs from the existing stator circumference by a select amount calculated to provide a particular speed-reduction/torque enhancement ratio. In operation, the rotating electromagnetic fields created by the stator of an existing machine would act to "force-wrap" the flexible rotor forward around the surface of the stator. However, to make such a design workable, the flexible rotor must be mechanically linked to either a central shaft or surrounding wheel rim using mechanical methods similar to those illustrated in FIGS. 1 & 2, and 8 thru 10 (see the additional linkage description sections below). When employing a flexible rotor and appropriate linkage mechanism many existing machines might benefit—the benefits being: "built-in" differential speed-reduction and torque-enhancement, higher efficiency, and lower overall weight and size as a drive train. However, the benefits will not be as great as they might be when all elements of this disclosure are incorporated into a complete motor-drive system or generator.

Linkage to a Central Shaft

Linkage to a central shaft (see FIGS. 7 thru 10) is more typical of most motors and generators, and is easily constructed for Flex Rotor Motors and Generators. First, the Stator design of FIGS. 1 & 2 must be configured with the rotor surrounded by the convex stator as illustrated in FIGS. 7 thru 10. This arrangement of the stator and rotor has the stator's working surface facing inward rather than outward and is again surrounded on three sides by a toroidal shell 28 that now has its open side facing inward, or concave, rather than outward. Laminates 14A and 17 of this arrangement of the stator and rotor are identical to laminates 14A and 17 of FIG. 3 for the motor-wheel stator. The flexible rotor of this arrangement is now pulled by actuators into contact with the inner surface of the stator, and has a circumference less than the inner stator circumference.

Power Generation

FIG. 7 illustrates a Flex Rotor Generator embodiment with central shaft designed for the sole purpose of electric power generation. This is the only flex rotor machine illustrated in the patent that does not use either a linkage mechanism (e.g., the rods and cylindrical pieces of FIGS. 1 and 2) or a mechanism to increase traction between the rotor and stator (e.g., the rods of FIGS. 8, 9 and 10). The rotor of this embodiment is perfectly smooth on both surfaces and can actually be lubricated, as slippage of the rotor is not an issue. In fact, lubrication is desirable to minimize wear as the four "lifting" assemblies (see FIG. 7A) sweep along the rotor surface as they separate the rotor from the stator surface. Since the two end sections always have a gasket the whole internal volume can contain oil with appropriate viscosity for this purpose. Each of the four lifter assemblies (FIG. 7A) is built using (1) rollers 63 with bearings 63-a, (2) a leading beveled edge 62-a, (3) a pair of heavy brackets 62 into which each end of the rollers with bearings and the beveled edge are tightly fitted, and (4) bolt holes and bolts 62-b that fasten the brackets to radial arms 64 on either side of the rotor. The brackets 62 and radial arms 64 are placed on either side of the rotor so they can be turned by the central shaft without contacting the sides of the stator. The hub of each set of radial arms is fastened securely to the central shaft 66 of the generator using locking keys 82. When an external force, such as that of a gasoline engine or windmill, turns this central shaft the radial arms turn and sweep the lifter assemblies forward around the inner surface of the stator and in this process "wedge" these lifter assemblies between the rotor and the stator lifting the rotor away from the stator surface. The beveled leading edge of each lifter assembly is coated with a very slippery substance such as polytetrafluoroethylene (PTFE), so that when the radial arms push the beveled edge forward to lift the flexible rotor away from the stator surface, the flexible rotor easily slides up and over this beveled edge. The rollers 63 and beveled edge 62-a are made from high-impact plastics and other non-magnetic, non-metallic, materials to eliminate magnetic losses. After the beveled edge slides under the flexible rotor the non-metallic rollers roll under continue to move the flexible rotor away from the stator surface until the flexible rotor has been lifted to its maximum distance from the stator surface. Past this point an additional roller allows the flexible rotor to gently return to the stator surface in at a location where there is no magnetic force of attraction. At this latter location it is only the spring-force of the flexible rotor that brings it back to the stator surface ready to be attracted to the stator again when a magnetic field is initiated at this new location in a continuing cycle. The entire apparatus for lifting the flexible rotor away from the stator is very robust in construction to handle the large forces of attraction between flexible rotor and stator that result when generating large amounts of power where, for instance, the generation of a kilowatt of power may produce attractive forces of 500 pounds or more. Also, with such large forces at play, the lifting assembly is deliberately structured to separate the flexible rotor from the stator in a very smooth and gradual fashion so that the flexible rotor is fully supported at all points by rollers so that the large forces involved do not deform the flexible rotor by causing it to bend at too great an angle while being separated from the stator surface. In operation, as the shaft 66 of this generator is made to turn by an external force the actuators are timed to turn on just prior to the beveled edge 62-a moving in to pry the rotor away from the stator—away from an actuator whose magnetic field is moving through the rotor from the actuator's north pole to the surrounding south poles. For example, in FIG. 7 actuators A3, A6, A9, and A12 are turned on just as a beveled edge is about to reach each of them. This is illustrated with a large "magnetic M" at each of these locations indicating the presence of a magnetic force of attraction. Forcing the rotor away from an active actuator requires mechanical force over the distance that the rotor is moved away from the stator. The work (energy) required to do this is converted into stored magnetic energy during the process—expanding the magnetic field into the air gap that is created as the rotor is pulled away from the working surface of each active actuator. This expanding magnetic field induces an increasingly larger voltage in the windings of these active actuators until the voltage is sufficient to drive electrical current out of the windings and into the output of the generator, which may be either a storage device or power-line load. The amount of energy produced will be equal to the amount of force required to separate the rotor from the stator times the separation distance, less resistive losses in the actuator windings. This is essentially a mechanism for converting mechanical energy into electrical energy. This process is managed by power circuits as controlled by the controller circuits (see Unique Flex Rotor Motor (FRM) Controller and Flex Rotor Motor Power Circuits sections below). While the embodiment illustrated in FIG. 7 was designed specifically for use as a generator, all the embodiments are capable of generating electrical power. In particular, the embodiment illustrated in FIG. 8 may be ideal for use as either a general-purpose motor or a generator (See Other Embodiments section below). All of our generators in the diagrams are three-phase generators, and thus produce constant current by cycling through three sets of actuators, each one producing power out just before the previous one stops producing power, and in this way there is never any interruption in the smooth production of power output.

The stator and case design of FIG. 7 is like that of FIG. 8 in which the device will be housed in a cylindrical housing 71 with circular end pieces 72 with a central shaft 66 and sealed right and left end bearings similar to 73 in FIG. 8. The end pieces will always leave space for the mounting of appropriate printed circuits on the inner surface of the end plates 72 as seen in FIG. 10. These circuit boards will contain the control circuits and power circuits for the generator, and will employ the end casing to radiate and dissipate the heat produced by these circuits and the screws that support them. The housing will have a length which will be a function of the width of the rotor and stator and the printed circuits which will be held against the inner surface of the end plates 72, and dimensions which will be a function of the number and size of Actuators used in the system, the amount of torque supplied by the external source and the amount of power to be generated. The Central Shaft 66 can be directly connected to a windmill shaft, or other rotating source of mechanical power.

FIG. 7 shows a machine to generate electricity and will not be used to form a motor. Construction of the radial arms is as follows: A single ring of metal tightly surrounds the shaft 66 comprising the "hub" of the radial arm assembly. There are three "keys" 82 assuring that the ring will turn with the shaft precisely. Extending from the ring are the radial arms: four equally spaced rigid strips of metal 64. These strips extend beyond the rotor leading to four lift assemblies (FIG. 7A) with brackets 62 on either side that are bolted to these metal strips (radial arms). A beveled bar 62A is placed at the leading edge of each lift assembly that touches the rotor but at no point touches the stator. The leading edges of these beveled bars are rounded so they won't cut into and damage the rotor. Further, a toroidal support channel 61 (as depicted in the lower left portion of FIG. 3), will contain the actuators comprising the stator. This toroidal element 61 will be made of aluminum 3303, which is a very rigid aluminum, which will also act as a heat sync to carry away heat generated by each of the actuators, conducting heat to the larger surrounding casing of the generator, which will act as a larger radiator to dissipate heat—heat that, in any case, will be minimal because of the efficiency of the system. This aluminum toroidal structure is not shown in FIG. 7, as it would conceal the configuration of the laminations and windings that comprise the stator. Aluminum is also anti-magnetic, which will confine the magnetic fields to the inside of the stator. As such, this aluminum shell helps prevent electromagnetic radiation and reduce the attraction of iron-based dust.

This machine operates as follows: when the central shaft 66 is turned by an external force the left and right cross-braced rigid strips of metal 64 turn, which then push the four lifter assemblies (FIG. 7A) forward to separate the rotor from the stator surface as they move. It should be made clear that of the 12 actuators shown in FIG. 7, there are only four active actuators at any one time and they are equally spaced around the stator's circumference. The four lifter assemblies occupy the space between the four active actuators—that is, the space of the two currently inactive actuators between the active actuators. Just prior to the leading edge of each lifter assembly moving in to pry the rotor away from the stator surface associated with each of four actuators (A3, A6, A9, and A12 as illustrated in FIG. 7), a small current is injected into the windings of those four actuators. This current creates magnetic north poles (center poles of the four active actuators—see FIG. 3) and magnetic south poles (side poles of the four actuators—see FIG. 3). Because the rotor is already against the stator surface at this point, and the north and south actuator poles are closely spaced, the amount of current needed to hold the rotor tightly in place against the stator surface is minimal. When lifter assemblies move in to force the rotor away from each active actuator, the mechanical energy from the shaft required to do this is converted into magnetic energy stored in the air gap that is thereby created between the rotor and stator. When maximum separation distance is reached these air gaps are filled with energy that has been converted to magnetic energy—energy equal to many times that used to establish the initial magnetic field for the four actuators that are energized simultaneously. As the magnetic field expands into the air gap of each active actuator, it induces a voltage in the windings of those actuators which in turn drives current out of these actuators and through the power electronics into the generator load—either a storage device or power line load. It is at the point of greatest separation—when a maximum amount of energy has been stored in the air gaps—that this induction of voltage and current in the four active actuators ceases and current stops flowing from these four actuators, and in effect they "turn off." Prior to "turning off," however, current forwarding is employed to inject a small amount of current into the next set of four actuators in sequence and the entire process is repeated. The completion of the two movements is controlled by the "inductance rotor position monitoring" explained below in the section "Flex Rotor Motor (FRM) Power Electronic Circuits."

Flex Rotor Motor Linkage to a Central Shaft

FIG. 8 illustrates an elevational view of the rotor internal to the stator and is mostly used as a motor. The stator of this embodiment is exactly as described for FIG. 7 with its working surface facing inward, and the rotor is again of smaller circumference than the inside stator circumference. However, other than these two likenesses, the structure of the Flexible Rotor Motor of FIG. 8 is very different from that of the generator of FIG. 7. Linkage for this central shaft embodiment is much the same as in FIGS. 1 & 2, and as described in paragraphs 0054-0056 above. FIG. 2C discloses half-round rods, not less than ¼ inch nor greater than ½ inch in diameter, spot welded to the rotor every one or two inches apart and the rods are extended on each end of the rotor by at least ½ an inch. This ½ inch extension on each side of the rotor will become a full-round rod (or rigid cylinder 5A) by spot welding a second ½ inch-long half-round rod to the bottom of this extension. Again, as described in paragraphs 0054-0056 above, cylindrical pieces 34 (FIG. 2B) are tightly fitted over these rigid cylinders 5A. And again, as described above, these cylindrical pieces made of elastomeric material compensate for variances in center-to-center distances between rods along the rotor as the rotor is wrapped around the stator. The strips or rods can help carry a quantity of flux if they are made of permeable metal.

Similar to the embodiment of FIGS. 1 and 2, structures, (65 and 67) with guide channels 70 cut into them are placed on either side of the rotor. The structures 65 and 67 of FIG. 8, however, are disc-shaped and their width does not extend as far as the castings in FIGS. 1 and 2, and do not extend more than a small distance past the inner radius of the stator. Further, these castings are solidly fastened by bearings to a central shaft 66 that rotates on right and left sealed bearings 73 mounted in the side motor housings 72. In addition, the stator (aluminum toroid containing the actuators) is solidly connected to the cylindrical motor housing 71. Again, the purpose of the cylindrical pieces 69 and guide channels 70 is to convert the circumferential movement of the rotor rods (and thus the rotor) into rotation of the castings that, in this case, cause rotation of the central shaft 66. The two bushings 87 and 88 solidly hold the disc-shaped structures 65/67 in order to provide a space for the printed circuit boards 9A and 9B and the proper separation between end plate 72 and the cylindrical pieces. If required, part of the bushing may be filled with oil with a given viscosity.

This motor operates in the same fashion as that of FIGS. 1 and 2, and provides differential speed reduction according to the difference in circumference of the rotor and stator. However, in this case, because the rotor circumference is less than the stator circumference, the rotor will move around the stator surface in a negative, or reverse, direction to that of the moving arches of the rotor, which follow the advancing magnetic fields of the stator.

FIGS. 9 & 10 illustrate another form of linkage to a central shaft with more robust elements to accomplish the rotation. This linkage employs a type of "tread" comprised of half-round rotor rods 81 (see FIG. 9), attached to the convex inner side of the rotor, with full-round ends on either side of the rotor. When magnetic forces pull the rotor against the stator surface, full-round ends of these rotor rods 81 fit into half circle-shaped cuts 79 in the sides of the toroidal shell 28A and 28C. These half circles 79 are shown clearly in FIG. 9, and to reveal the laminations and windings encased by it a center-cut reveal section is shown for the top quarter of the motor. This linkage mechanism using full-round ends on the rotor rods 81 and stator support half circles 79 that accept these full-round ends prevents slippage of the rotor on the stator surface when large torque outputs are demanded of the motor. Rotor rods are not needed in motors where large torque output is not required, as the magnetic forces holding the rotor against the stator tend to prevent the belt from slipping when high torque output is not involved; and the differential gear-reduction effect would be the same regardless of whether rods were employed. However, the other function of rotor rods, with full-round ends sitting on either side of the rotor, is to keep the rotor properly lined up with the stator surface as it is force-wrapped around the inside of the stator surface.

The center-to-center spacing of the half-circles in the stator support structure must match the distance that a rotor rod moves along the stator surface when it is lifted up into the rotor arch and then comes back down to the stator surface. This distance is equal to the rotor-stator circumference difference divided by the number of rotor-stator contact regions. For example, in FIG. 9 the stator circumference is 36 inches and the rotor circumference is 34 inches. The rotor-stator circumference difference is thus two inches (the stator is two inches greater in circumference than the rotor), and the number of rotor-stator contact regions is four. Thus, the center-to-center spacing of the half circles around the stator support structure must be two divided by four equals one-half inch. Further, the center-to-center spacing of the rotor rods along the rotor must either match or be a multiple of the spacing of the half-circles so that when the rotor is held tightly against the stator surface, the rotor rod spacing matches the available spacing between half circles. In the example of FIG. 9, the spacing of the rotor rods on the rotor is one inch, a multiple of one half inch. Alternate spacing possible would be either the spacing of the half-circles (half an inch), or another multiple of half an inch, such as an inch and a half, etc. The spacing of half-circle cuts in the rotor drum must likewise follow the same formula as that for the stator: it is equal to the rotor-rotor drum circumference difference divided by the number of rotor-rotor drum contact regions. For example, in FIG. 9 the rotor circumference is 34 inches and the rotor drum circumference is 32 inches, thus the rotor is two inches longer than the rotor drum circumference. The number of contract regions is again four. Thus the center-to-center spacing of the half-circle grooves in the rotor drum must be two inches divided by four contact regions equals one-half inch.

Another major difference in the mechanical linkage of FIGS. 9 & 10 is a rotating drum (drum rotor) comprised of side castings 65 and 67 and cylindrical drums surface 82. The side castings 65 and 67 of the drum rotor are securely fastened to the central shaft 66 using shaft keys 83 and 84, so that when the rotor causes the drum structure to rotate, the central shaft rotates. The diameter of the drum rotor is set so that when the rotor is magnetically pulled against the four actuators at 90-degree locations around the stator, the rotor arches are pulled tight against the drum rotor surface (see FIGS. 9 & 10). Half-circle grooves 80 in the side castings 65 and 67 and drum rotor 82 form a type of inverse tread that accepts the rotor rods 81 so that movement of the rotor is mechanically linked to rotation of the drum rotor and central shaft. The resultant differential gear reduction ratio is a combination of the differential ratio of the rotor with the stator, and the drum rotor with the rotor. Making the approximation that the rotor's inside circumference is approximately the same as its outside circumference, as compared with the circumference of the drum rotor, the differential gear reduction ratio G reduces to the following simple equation:

$$G = 1 - \frac{S_{Circ}}{D_{Circ}},$$ EQ. 2 where $S_{Circ}$=Stator Inner Circumference, and $D_{Circ}$=Drum Circumference.

Since $S_{Circ}$ is always larger than Dam, G will always be negative—meaning, the drum rotor will always rotate counter to the direction of rotation of the magnetic fields around the stator (the actuator sequence). In FIG. 9 $S_{Circ}$=10 units, $D_{Circ}$=9 units, and thus G=1:9. Using this linkage mechanism, the range of possible gear reduction ratios is somewhat more limited, as the drum rotor diameter cannot be smaller than about 86% of the inner stator diameter. This translates into a minimum G ratio of about 1:6. The maximum is still fairly unlimited, though for practical purposes ratios greater than 1:100 may be difficult to achieve in small motors.

FIG. 10 shows how this stator-rotor-drum rotor mechanism is housed in a motor casing comprised of a cylindrical piece 30, to which the aluminum stator support structure 74 is fixed, and round end plates 31, which house the sealed bearings 73 in which the central shaft 66 rotates. The keys 83 and 84 firmly lock the drum rotor to this shaft. FIG. 10 also shows the bolts 85 that firmly hold the cylindrical part of the drum in place between the castings 65 and 67. In FIGS. 8 and 10 it should be noticed that there are two bushings 87 and 88 to maintain the position of the shaft 66 and allow for printed circuits on each side.

The Stator

The second-most important element of the invention, after the rotor, is the stator. The design of this stator is completely unique, being comprised of a series of actuators (12 in the embodiments illustrated in FIGS. 1 thru 10), as opposed to a series of windings wrapped around sequential electromagnetic stator poles made of magnetic laminations. Unlike any existing stator, the purpose of the disclosed Stator is to "force-wrap" the rotor around the stator surface, as illustrated in some detail in FIG. 4. The top of FIG. 4 shows a 3-D slice through the middle of an active actuator 3 within the stator. The windings 15 of this actuator are carrying electrical current that produces magnetic poles, which attract the rotor to the stator surface. The "force-wrap" action is illustrated in a time-sequence T-1, T-2, and T-3. This sequence shows the wrapping movement of the rotor from one actuator to the next as actuator #12 switches off, and actuator #1 switches on. The objective in designing this unique actuated stator is (1) to maximize efficiency as well as minimize weight and space while providing large output torque for motors and large output power for generators, and (2) to create an efficient magnetic design for force wrapping a flexible rotor that is nearly as thin as a single lamination of the soft iron.

FIG. 3 shows two complete actuators as shown from the top without curvature. The second row of figures shows a cross section of the two actuators as shown by the cut line B and 28C by the cut line B' in row A. The third row shows the shape of each of the three types of laminations comprising the stator: 14, 16 14A, and 17 respectively. On the top and left side of the two rows are shown partially the two sections of the toroidal three sided shell 28C.

Laminates 17, with three "prongs," form the "core" of each actuator. The central prong of 17 is wider than the two side prongs, as it must carry twice the magnetic flux of the side prongs. The height of all the prongs of all the laminates is identical. Laminates 17 are epoxied together such that the central prongs form a rectangle and the void between the central prongs and the end prongs form two channels into which the horizontal segment of the windings are placed such that the top layer of the winding is approximately 10 mils below the ends of the prongs. Inter-actuator laminates 14 forms a magnetic pole between actuators that helps to move the rotor along from one actuator to the next. Laminates 14A were designed for a "concave" stator where the working surface faces inward (see FIGS. 7, 8, 9 and 10). Inter-actuator laminates 16 help to completely surround the windings 15 with magnetic material so all the magnetic flux produced by the windings is employed in the production of forces pulling the rotor against the stator surface. The bottom row of FIG. 3 shows two cross-sections of the stator toroidal support structure 28. The drawing on the left shows a stator with its active surface facing inward to wrap a Rotor around its inner circumference, and the drawing on the right side shows a stator with its active surface facing outward to wrap a rotor around its outer circumference. As indicated, the toroidal support structure (shell) is referenced by its sides, 28A and 28C, and its back, 28B as shown in FIG. 3. These laminates are ⅛ of an inch longer so that every three to ten of these adjoining laminates 17 can be slipped into an inner slot of the toroidal shell and then epoxied into these two slots.

To efficiently produce large torque (or power output) employing a thin rotor, a new kind of magnetic stator design was developed based on principles of efficient design for actuators. This new magnetic design fully encloses the windings of the stator with highly permeable magnetic materials—soft iron in the actuators and inter-actuator laminations, employs closely-spaced magnetic poles to create very "tight" magnetic circuits (See top of FIG. 4), and a rotor (armature) made of highly permeable material (e.g., permendur) capable of conducting very large amounts of magnetic flux without saturating. The result is a design where none of the magnetic flux created by the actuator windings goes unused, as it does in other motors where the magnetic fields created by "end windings" are simply a waste of energy. Further, the very short ("tight") magnetic circuits minimize reluctance (the equivalent of electrical resistance for magnetic circuits), so that there is very little resistance to the flow of magnetic flux, which results in high efficiency. Also, minimizing the length of the magnetic circuit, especially through the rotor, greatly reduces the impact of employing a thin rotor in this design. Finally, by establishing magnetic circuits that flow across the rotor rather than around the rotor, then more rotor surface area is used, which lowers the amount of reluctance (resistance) to the flow of magnetic flux, increasing efficiency.

The stator embodiment illustrated in FIGS. 1 & 2 is constructed as a ring of 12 equally-spaced actuators 3 mounted into a rigid aluminum three-sided toroidal shell 28, the bottom and top cross-section of which is shown in FIGS. 2 & 3. A section of the toroidal channel is shown where the black represents the small section of the toroidal channel with its half-circle indentations to accept the rotor rods. These details are not shown in the other figures for simplicity sake, however this same basic stator construction is employed in all the disclosed designs and as such (1) acts as a heat sink for the stator actuators in each of those designs and (2) confines the magnetic fields to the inside of the stator, helping prevent electromagnetic radiation and reducing the attraction of iron-based dust. For motors and generators employing a central shaft (see FIGS. 7 thru 10) where the rotor is force-wrapped around the inside circumference of the stator, the toroidal shell has its open side facing inwards rather than outwards, and the stator construction is as shown in FIGS. 7 and 9. For these designs the magnetic poles of the actuators face inward so that the electromagnetic forces are created on the inner circumference surface of the stator, and act to pull the rotor—now inside the stator circumference—outward to contact the inner stator surface (see FIG. 9). The two sides of the toroidal shell 28 are slightly higher then the laminations and windings comprising the actuators 3 by an amount equal to the thickness of the rotor (see bottom of FIG. 3) so that the rotor fits snugly between these sides and remains in place directly over the stator surface during operation.

In the example of FIG. 3, the actuators 3 are comprised of soft iron laminates 17 that are 50 mils thick and windings 15 comprised of 240 wraps of wire (15 wide by 16 layers) of 20 gauge wires. Inter-actuator laminates 14 and 14A, also 50 mils thick, fill the space between actuators (see FIG. 3) to provide a south magnetic pole between actuators and to completely surround the windings 15 with magnetic material so that the design makes full use of the magnetic fields generated by the windings. For the Stators of FIGS. 7 thru 10, the laminate 14 is replaced with 14A to match the concave shape of those stators. It is not necessary that these exact actuator and stator dimensions and gauge and numbers of windings be used for Flex Rotor Motors and Generators: these particular dimensions and numbers were selected for this particular embodiment as an example of a general-purpose motor design. For larger motors and generators (as well as smaller ones) the lamination dimensions, wire gauge, wire channel size and number of windings would be selected according to desired performance criteria. For instance, for larger horsepower motors heavier gauge windings would be employed.

Figure 5:
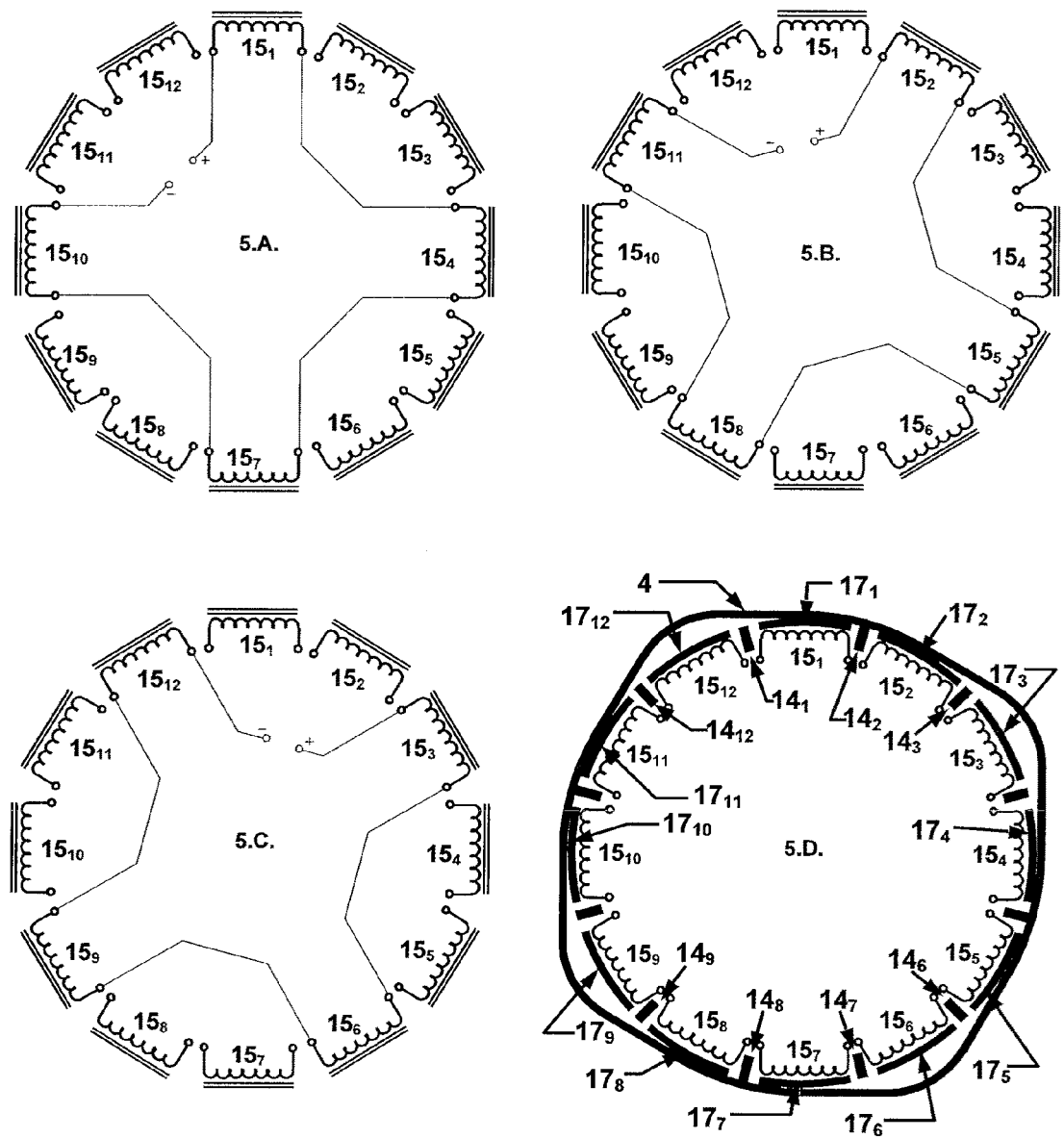
FIG. 5 is a motor winding circuit connection drawings for phase A, B and C. Sub-drawing 5.A includes the rotor and the inter-actuator.

The laminates 17 will be pre-assembled (epoxied together) as a "stack" of 25 laminates comprising an Actuator "core." In addition to bonding the laminates together, the epoxy acts to insulate adjacent laminates and thereby prevent eddy currents that would otherwise flow through the conductive soft iron in a circular plane perpendicular to the direction of the magnetic flux lines. Three of the laminates 17 in the center of each actuator "core" will be wider by 100 mils on each side. Radial slots 100 mils deep and 150 mils wide will be cut into the sides (28A and 28C) of the support shell 28 to accept these three wider laminates 17. These radial slots will be located at 30-degree intervals around 28 so that when inserted into the toroid the actuator cores (and thus the final actuator assembly) will be precisely located and firmly held at these locations. Laminates 14 (or 14A) and 16 (also be pre-assembled as a "stack") will then be epoxied in place between the actuator cores. Finally, pre-wound windings 15 will be epoxied in place in the winding channels formed by laminates 17, 14 (or 14A) and 16. Small cutouts in the bottom right and bottom left corners of the two of laminates 16 adjacent to either side of the windings will accommodate the pass-through of wire-ends from each of the windings, and holes drilled in 28B of the support shell will allow the pass through of wires from the windings to the b-side of the toroidal shell. Wires will be run along the back (28B) of the support shell to connect the actuator windings together in series-connected sets of four windings, where each set of four comprises one of three wiring phases, as shown in FIG. 5. The resultant stator is a rugged, robust component used for each embodiment of the invention; whether it is a motor or a generator.

The upper edge of the laminates may be hardened to better withstand the rolling of the rotor over the surface of the laminates, which comprise the working surface of the stator. The orientation of laminates was selected to provide an unbroken conduit for magnetic lines of flux while eliminating most eddy current losses—a remedy to eddy current losses well known in the magnetic design of actuators, transformers, motors and generators. The thickness of these laminations was chosen according to the top speed of the motor, as the faster the magnetic fields are required to switch on and off, the thinner the laminations must be to eliminate the majority of eddy current losses. Thus, the number of laminations in each "stack" of laminations will depend on the expected operating speed of the motor/generator and the physical size of the actuators used. The physical size is selected such that the number of actuators and inter-actuators used in the support structure 28 fits perfectly around the stator surface with no room to spare. The width of the actuator is selected to match the width of the rotor, which will occupy the internal width of the channel and the width of the rotor is selected to match the power required for the task.

Figure 4:
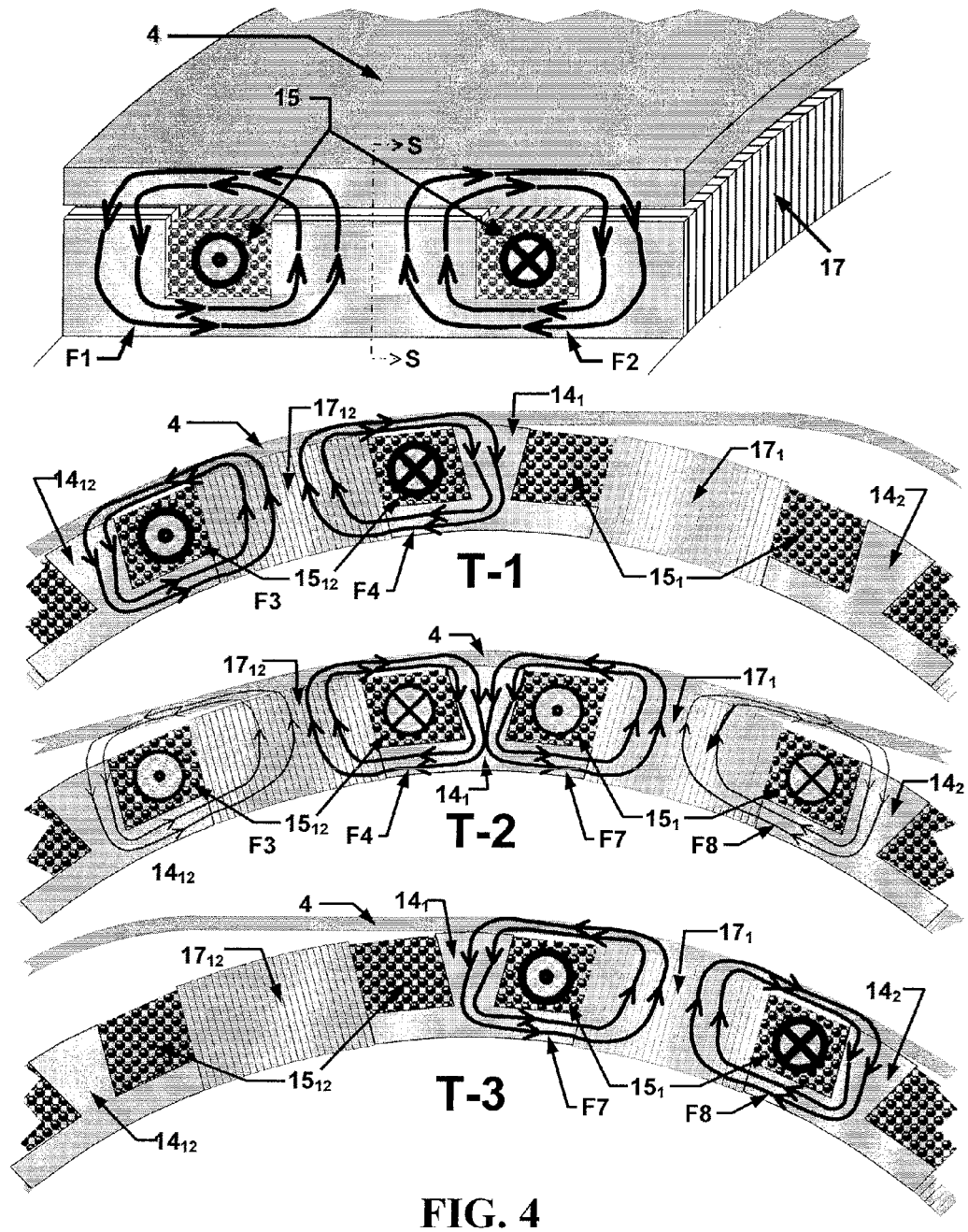
FIG. 4 is a top of page: 3D drawing of rotor and stator below: timing indication of rotor positions at times T-1, T-2 and T-3.

FIG. 4 Top is a 3D drawing of a transverse cut-a-way section showing just the rotor cut-a-way and a cut-a-way section of the mid-section of one actuator revealing the face of one lamination 17, and a cut-through of the windings 15 showing a right half and left half of the winding as it sits in the winding channels formed by laminations 17. For purposes of illustration and clarity, the rotor is shown as proportionally thicker than it actually is. When the actuator shown is switched on, electric current flows through the windings, as is indicated by the symbols ⊙ and ⓧ. These symbols indicate the direction of flow of the electric current in each half of the winding. The symbol ⊙ on the right half of the winding indicates that current is flowing out of the page of the drawing. This symbol is meant to be reminiscent of the head of an arrow as seen face on. The ⓧ symbol indicates that current is flowing into the page of the drawing and is reminiscent of the tail of an arrow as seen face on.

When electric current flows through the windings as shown, it produces magnetic flux that flows in circles around the windings in a plane perpendicular to the windings and in a direction dictated by the "Right Hand Rule"—meaning a clockwise direction when electric current is moving away from the viewer into the paper, and a counter-clockwise direction when the electric current is moving out of the paper toward the viewer, as is shown. The amounts of magnetic flux—the strength of the magnetic lines of force—is directly proportional to the amount of current flowing in the windings and inversely proportional to the length of the magnetic flux paths flowing in the magnetic circuit. As stated above, our purpose in the design of these actuators was to make them as efficient at possible, and one way of doing this was to make the magnetic flux paths in the magnetic circuit as short as possible, thereby minimizing the reluctance of the magnetic circuit and maximizing the amount of force produced per amp of current flowing in the windings. We actually have a cluster of short or tight flux paths flowing in three dimensions around the windings through laminates 17, 14, and 16 so that the center pole of each actuator (a north pole in this case) is surround on all side by south poles. In addition there are actually four sets of flux paths for each active actuator since the winding has two horizontal and two vertical segments. Therefore there are four separate clusters of short flux paths. This design maximizes the force of attraction of the rotor and the efficiency of the system. While such short flux paths are typical of actuator designs, and while they provide a clear advantage for our Flexible Rotor Motor/Generator designs, short flux path designs are unusual and even undesirable for most motors and generators because of the strong forces of attraction they create between the rotor and stator, which must be resisted via the use of more robust construction materials. The ability to make effective use of short, efficient flux paths, then, is one more advantage that the Flexible Rotor Motor/Generator has over other motors and generators.

The amount of magnetic flux also varies with the type of magnetic material surrounding the windings. The soft iron laminations (14, 14A, 16 and 17) comprising our actuators, and the highly permeable material comprising the Rotor 4, present minimal reluctance (resistance) to the flow of magnetic flux, and both materials are capable of handling large magnetic fields without saturating. This means that our magnetic materials can efficiently support the production of very large torques in a motor and large power output in a generator.

It should also be noted that FIG. 4 shows magnetic flux flowing in two different planes: (1) a transverse plane perpendicular to the direction of motor/generator rotation and (2) a plane in alignment with the direction of rotation of the motor/generator. The circular flux paths labeled as F1 and F2, as indicated by the circles of arrows in FIG. 4 show the flow of magnetic flux in a transverse plane, and the circular flux paths labeled as F3 and F4, as indicated by the arrows in FIGS. 4 T-1, T-2, and T-3, show the flow of magnetic flux in a plane aligned with the rotation of the rotor. There are additional flux paths flowing around the corners of the windings as well that are not shown that combine to maximize output and efficiency. Flux paths F5 and F6 are equivalent to F1 and F2 but are not shown in FIG. 4 because they lay in the plane of the drawing. Such a three-dimensional magnetic circuit is very unusual in motor/generator designs, but is very deliberate in this case as the inventors wish to capture and make best use of all the magnetic fields created by all parts of the actuator windings to fully optimize Flex Rotor Motor/Generator efficiency.

FIGS. 4 T-1, T-2, T-3 show a time sequence of flux paths in the plane of rotation of the rotor as the rotor is force-wrapped in a clockwise direction around the stator surface from one actuator to the next (from A12 to A1). It should be remembered that magnetic flux in the transverse direction, being created by the same electrical currents, moves forward in unison, matching the locations of the magnetic flux lines indicated at times T-1, T-2, and T-3. At time T-1 the rotor is being held firmly against the stator surface by the magnetic fields created by actuator winding $15_{12}$ of actuator A12. The rotor is also in a position where it can be attracted to the next actuator in clockwise sequence, A1, when winding $15_1$ is turned on. At time T-2 winding $15_1$ has been turned on and current is ramping up while the current in winding $15_{12}$ is ramping down as it is being turned off. At T-2, the current in actuator A12 has dropped to half its peak value and the current in A1 has increased to half of its peak value so that the rotor is straddling the inter-actuator laminations 14 and 14A between the two actuators. At this point the two actuator windings share a common flux linkage through the inter-actuator laminations and the rotor. This magnetic linkage establishes a temporary transformer effect whereby the remaining current in winding $15_{12}$ can be "instantly" transferred forward into winding $15_1$ via this transformer effect. This is called "current forwarding" by the inventors, and is an efficient means of quickly moving current from one winding into the next winding in sequence. This is discussed in more detail in the Current Forwarding section.

At time T-3 all current in winding $15_{12}$ has been shut off, having been "forwarded" to winding $15_1$, and actuator A15 has totally released its hold on the rotor, which has sprung up and away from the surface of A15. At the same time, the current in winding $15_1$ has reached its peak and now firmly holds the rotor against actuator A1. In essence, the illustrated time sequence from T-1 to T-3 shows the coordinated "hand-off" that occurs in the process of sequentially force-wrapping the rotor around the stator surface from one actuator to the next, and then the next, etc. This is all controlled by electronic circuitry described in detail below.

The difference between the stator of this invention and any other (such as that of a typical switched reluctance motor that may seem like a series of individual actuators) is that each actuator is "self-contained," meaning the windings and the magnetic paths for activation (both north and south magnetic poles) are fully contained within each actuator, and each actuator treats the portion of the rotor over it—and only this portion of the rotor—as though it were its own armature. There is no "back iron" carrying magnetic fields around the stator circumference, and magnetic flux is not carried through the thin rotor around to other Actuators. The elimination of "back iron" considerably reduces the weight of this design over existing stator designs and helps increase motor efficiency. Further, because magnetic fields are carried only a very short distance through the rotor (from the center pole of the actuator to the sides of the same actuator), the rotor can be thin and flexible and very light-weight because the distance it must carry magnetic flux is very short, meaning the reluctance (resistance to magnetic flux) is small. Again refer to the three-dimensional drawing at the top of FIG. 4. Finally, as is the case in most actuators (but not motors), the windings are completely contained, meaning completely surrounded by soft iron or other highly permeable material. Most motors and generators have "end windings"—windings that stick out past the magnetic materials of the motor. End windings produce magnetic fields that are not used—wasting energy and lowering efficiency. In contrast, when windings are fully enclosed by magnetic materials and those materials provide paths for the completion of magnetic circuits and the production of useful forces, then every bit of the electrical power consumed by the windings help to produce motor torque (or electrical power in the case of a generator). Further, all the weight and space taken up by the wire is productive.

The embodiments herein disclosed are but one of many variations possible for the stator of a Flex Rotor Motor/Generator. The outer fixed circular circumference of the stators in FIGS. 1-2 measures 34 inches. In the other figures and drawings this is deliberately left unspecified, as dimensions can be selected that best suit the use of a particular motor or generator. Further, the stator can be oriented so that the working surface—the surface against which the rotor is force wrapped—is faced outward, as is shown in FIGS. 1 & 2; or inward, as is shown in FIGS. 7 thru 10. That is, the stator can be constructed so that the rotor is force-wrapped either around its outside surface or its inside surface. In the particular embodiments discussed and illustrated in this disclosure, the stator consists of 12 actuators 3. Twelve is not a "magic" number—it is the result of choosing to have four rotor contact areas with the stator and the choice to use a typical three-phase winding scheme for the sequentially actuated design. Four equally spaced contact locations around the stator, along with the choice to use a three-phase design, results in a minimum of 12 actuators. Thus, for the sake of simplicity, all our figures reference a twelve actuator stator design with the actuators labeled as A1 through A12. However, it should be noted that there are many alternatives and much flexibility possible in the design of a sequentially-actuated stator. For instance, we could have chosen three contact areas around the stator in a three-phase design and used 9 actuators as a minimum. We also could have chosen a two-phase design and 5 equally-spaced contact points around the stator that would have resulted in a 10 actuator minimum stator design. In fact, a two-phase design is very workable and can produce more torque per pound as a motor and more power output per pound as a generator than a three-phase embodiment. The only drawback is that it requires conversion circuitry for a two-phase motor to run from typical AC sources of power, and output power conversion circuitry for a two-phase generator to convert the output to appropriate AC formats.

Mechanical Design of a Motor Wheel

FIGS. 1 and 2 reveal the overall mechanical design of the motor-wheel. The tire 1 maintains its outline by a solid tube 2. There is a standard cutout in the left casting 6 that conforms to a conventional tire and when a third casting is used between casting 6 and 7 a wide tire is mounted to the outer surface of the third casting. Instead of placing a tire into the typical cutout for it on the outer circumferential part of the casting there could be sprocket-like structures to power another machine with a power or timing belt and other uses can be made of the rotating power.

The hex nut 24 can now be threaded onto the primary axle, and tightened. It will hold all of the components in their proper positions. It will also hold the stator fixed to the circular aluminum shelf. If there are any possibilities of the hex nut loosening, we can either use a product such as "Lock Tight" or we can again resort to small bolts to assure that the hex nut will not loosen.

External Cable

On the left side of FIG. 2 there is an inline connector 13 from which a cable connects into a groove on the inner side of the primary flange of 66 and thereafter is tightly placed into a groove in the internal surface of the secondary axle 23A until it reaches two holes at the top and bottom of the secondary axle as well as a single hole in the primary axle for the appropriate wires to either of the top group of circuit boards or the bottom group of circuit boards. The two groups of higher and lower circuits are also interconnected using these two holes of the primary and secondary axles. This arrangement of the cable coming into the wheel and the fact that the bearings 22 are sealed will prevent splashing and dirt from entering the central portion of the wheel.

Discrete Shaft Rotation Using the Apparatus of the Invention

The rotor can be held in a stable, locked, position when sections of it have been pulled fully against the stator surface by active actuators. Discrete, incremental shaft rotations are accomplished by wrapping the rotor forward from one actuator to the next via an Actuator Handoff Cycle managed by the electronic controller (see details of the controller below). For the embodiment disclosed in FIGS. 1 and 2, where the rotor circumference is 36 inches and the outer stator circumference is 34 inches, and 12 actuators are embedded around the stator surface, wrapping the rotor forward from one actuator to the next in this handoff cycle shifts the rotor belt forward around the stator surface by one-twelfth of the amount that it shifts forward on a full stator cycle—a sequence of 12 Actuator Handoff Cycles. The rotor of this embodiment rotates 20 degrees around the stator for every full stator cycle (sequence of 12 actuator cycles). Thus, for one actuator cycle, in which the rotor is released by one set of 4 actuators and wrapped forward to the next group of actuators, the rotor rotates by one-twelfth of 20 degrees, or 1.67 degrees. This can be accomplished via a single command of the controller. Thus this embodiment can position the surrounding wheel or selection arm at 1.67-degreeincrements (216 positions), which is 0.00463 of a revolution. The motor can hold the wheel or selection arm in each of these positions with high tolerance, as the feedback system implemented in the controller is highly sensitive to any movement of the rotor, and this feedback is used to adjust the amount of force applied to the rotor to keep it in position so that the wheel can effectively be locked in position at any one of 216 points. Two of our FRM/G's can be used in the well known XY movement for positioning a selection mechanism such as placement of dual inline chips—216 positions for X and 216 positions for Y. Thus, in addition to providing differential speed reduction, this motor provides a positioning and locking ability comparable to many positioning systems but implemented in a far different combination of elements. Further, the number of discrete positioning points can be increased by simply using a rotor that is closer in circumference to the stator. For instance, by replacing the 36-inch rotor with a 35-inch rotor for this embodiment, the speed ratio is increased to 1:35, or a rotor rotation per stator cycle of 360/35=10.286 degrees. Dividing this by 12, we find that every actuator cycle moves the rotor by 0.857 degrees, and we have 360/0.857=420 points that the wheel can be precisely locked into place. This is an example of obtaining a gear ratio without the introduction of anything but the stator length and the rotor length which are used for other purposes.

Motor Wiring

FIG. 5 shows how the windings of all the various motor and generator embodiments are wired together so as to act as a three-phase motor or generator. As is shown in FIG. 5, winding phase A is comprised of the series-connected windings $15_1$, $15_4$, $15_7$ and $15_{10}$; winding phase B is comprised of the series-connected windings $15_2$, $15_5$, $15_8$, and $15_{11}$; and winding phase C is comprised of the series-connected windings $15_3$, $15_6$, $15_9$, and $15_{12}$. It would be possible, but not optimal, to run this motor as a three-phase synchronous motor by connecting these three winding phases to a typical three-phase ac current source. However, an ac three-phase current source will not drive this motor at optimal efficiently and torque, and certainly will not enable current forwarding with all of its efficiency and torque production advantages. Thus, a special motor controller was developed for the FRM/G to optimize efficiency and torque/power output.

Magnetic Operation of the Apparatus

FIG. 4 illustrates the magnetic operation of the motor. FIG. 4 Top is a 3D drawing of a cut-a-way section showing a rotor and stator cut-a-way through the middle of actuator laminations 17, and winding 15. Electric current is flowing through windings 15, as indicated in the drawing by the symbols ⊙ and ⊗. These symbols indicate the direction of the flow of the electric current through the cut-away winding, where ⊙ (reminiscent of the head of an arrow as seen face on) indicates current is flowing out of the page of the drawing, and ⊗ (reminiscent of the tail of an arrow seen face on) indicates current is flowing into the page of the drawing. This flow of electrical current through the windings creates magnetic fields with magnetic flux that flows in circular paths F1 and F2 around the windings according to the Right Hand Rule, with flux flowing up the center post of laminations 17, up through the very minimal air gap to the rotor, out to each side of the rotor, down through the very minimal air gap to each side post of 17, and back from each side of 17 to the center of 17. There are also two other flux paths (F3 and F4) around the windings. Looking at FIG. 4 T-1, flux F3 flows up the center post of 17 to the rotor, along the rotor to inter-actuator laminations $14_1$, down into $14_1$ and then through the left "arm" of $14_1$ back to the center post of 17; and flux F4 flows up the center post of 17 to the rotor, along the rotor to inter-actuator laminations $14_{12}$, down into $14_{12}$ and then through the right "arm" of $14_{12}$ back to the center post of 17. By definition, the top of the center post of 17, where flux flows out, is the north magnetic pole; and the tops of the side posts of 17 and the tops of $14_1$ and $14_{12}$, where magnetic flux flows back into the laminations, are south magnetic poles. The amount of flux flowing is directly proportional to the amount of current flowing in the windings and inversely proportional to the length of the magnetic circuit. Note that the plane of inter-actuator laminations 14 is oriented in a circumferential direction to carry flux F3 and F4, and the plane of actuator laminations 17 are oriented in a transverse direction to carry flux F1 and F2 that is flowing in this transverse direction. These particular orientations of the laminations reduce what is known as Eddy Current Losses. These are losses that result from the inducement of currents flowing in circles perpendicular to the magnetic flux lines when electrically conductive iron is used. Laminating the iron and using the natural insulating nature of iron oxide as well as the insulation provided by the epoxy holding them together, prevents these losses.

Another novel aspect of this design is that flux paths F1 and F2 flow in a plane perpendicular to the movement of the motor. This is unique, as most other motors/generators incorporate flux paths in line with the direction of motion. In our design, however, these transverse flux paths produce the primary forces of magnetic attraction. Further, it is this novel flux path arrangement that makes possible the very tight magnetic flux paths achieved, minimizing losses caused by the longer flux paths found in many other motors/generators, and maximizing torque (or power) production. The additional flux paths F3 and F4 shown in FIG. 4 T-1 are in the typical circumferential direction of most other motors/generators. In the FRM/G these additional flux paths are employed for four primary reasons: (1) to take advantage of every bit of the magnetic fields produced by the windings to maximize magnetic forces, (2) to smooth the motion of the rotor 4 as one actuator turns off and the next in sequence turns on, (3) to insure that the rotor is held tightly against the stator surface so as to prevent backwards slippage as it is "wrapped" forward from one actuator to the next pushing the surrounding wheel forward, and (4) current forwarding. Current forwarding is a means of "instantly" transferring current forward from one actuator winding to the next as the rotor moves forward, which increases efficiency and the ability to produce large torque at higher speeds. This is described in detail below in the "Current Forwarding" section.

The sequence of drawings FIGS. 4 T-1, T-2, and T-3 show how the sequenced turn-on and turn-off of electrical currents in the windings produce magnetic forces that force-wrap the rotor from one actuator to the next around the stator circumference. At time T-1 current is flowing in winding $15_{12}$ (Actuator $3_{12}$) creating magnetic flux that flows through laminations $17_{12}$, the inter-actuator laminations $14_{12}$ and $14_1$, and the rotor. The forces of magnetic flux act in a manner similar to the forces of tautly-stretched bands pulling together all magnetic elements of the structure to remove any air gaps— that is, pulling and holding the rotor against the surface of the actuator creating the magnetic field, $3_{12}$. There is no current flowing through winding $15_1$ of actuator $3_1$ at this same time (T-1), thus no magnetic field (or any forces of attraction) at this location; thus here is where the extra length of the rotor has sprung away from the stator surface to rise up into an "arch" over actuator $3_1$ (comprised of $17_1$ and $15_1$), with the peak of this "arch" sitting directly over inter-actuator laminations 142.

The force-wrap of the rotor from contact with the actuator $3_{12}$ surface to contact with the actuator $3_1$ surface is accomplished by ramping down the current of actuator $3_{12}$ (Winding $15_{12}$) while ramping up the current of actuator $3_1$ (winding $15_1$). T-2 shows the half-way point where the current in actuator $3_{12}$ (winding $15_{12}$) has dropped to half, and the current in actuator $3_1$ (winding $15_1$) has increased to half of its final peak value; and at time T-3 the current in actuator $3_{12}$ (winding $15_{12}$) has dropped to zero, and the current in actuator $3_1$ (winding $15_1$) has increased to its final peak value creating magnetic flux that holds a new portion of the rotor tightly against the stator surface.

In this process the portion of the rotor first held against the surface of $17_{12}$ at time T-1 springs away from the stator surface as the current in winding $15_{12}$ goes to zero, and the portion of the rotor "arch" over $17_1$ is pulled down to the surface of actuator $3_1$ as current in winding $15_1$ ramps up to its peak at T-3. That is, the trailing (left) edge of the rotor "arch" in view is pulled against the stator surface by $3_1$, and the leading (right) edge of another rotor "arch" (out of view to the left) rises into view as the rotor springs away from the surface of $17_{12}$. This entire process occurs simultaneously at 4 equally-spaced locations around the stator involving each winding (Actuator) linked together in series as shown in the phase winding drawings of FIG. 5. In other words, Windings $15_{12}$, $15_3$, $15_6$, and $15_9$ ramps down and turn off while windings $15_1$, $15_4$, $15_7$, and $15_{10}$ ramp up and turn on. This constitutes a "force-wrap" cycle—a cycle that is repeated over and over in sequence as the means by which the rotor's position is incrementally shifted forward (or backward) around the stator circumference to turn a surrounding wheel (or a central shaft). For the motor embodiments herein disclosed, this process must be repeated in sequence 12 times to move the magnetic rotor-stator points of contact once around the stator, which constitutes one rotation of the stator's magnetic fields. In other motors, this would be called one motor rotation, as in all other motors the rotor follows the rotation of the magnetic field. However, in the FRM the rotor only moves forward a differential amount with each magnetic rotation. Thus, for the FRM the differential gear ratio is the ratio of output turns to magnetic rotations (rotations of the rotor-stator points of contact), rather the rotor rotations.

Balance point. At time T-2 the rotor 4 is "balanced" on the interactuator laminations $14_1$ between actuator $3_{12}$ and actuator $3_1$. The flux F4 and F7 produced by actuators $3_{12}$ and $3_1$ helps hold the rotor against the stator at this "balance" point as the transition from actuator $3_{12}$ to actuator $3_1$ takes place. Holding the rotor tightly against the stator surface is necessary at this "balance" point to prevent the rotor from slipping backward—any resistance by the wheel to forward movement (i.e., counter torque) would cause the rotor 4 to slip backward at this transition time (T-2) if magnetic flux flowing through the inter-actuator laminations $14_1$ did not hold the rotor 4 tightly against the stator surface at this critical time. This is also the time when current forwarding takes place, throwing the remaining current into $15_{12}$ forward to $15_1$ so that $15_{12}$ is completely shut off and $15_1$ is completely turned on. For current forwarding to take place efficiently, the rotor must be in solid contact with laminations $14_1$.

Current Forwarding

This is novel feature of the Flex-Rotor Motor/Generator. As the rotor is "force-wrapped" forward to the "balance" point between actuators and comes into contact with the inter-actuator laminations 14, it creates a common flux path between the windings of the actuators to either side of the inter-actuator laminations 14 (or 14A). When two windings are linked by a common flux path (the path through the inter-actuator laminations created when the rotor comes into contact with them), a transformer is formed linking the two windings. In the example of FIG. 4 at time T-2 a transformer linkage is formed between winding $15_{12}$ and winding $15_1$ when the Rotor 4 comes down against $14_1$. The windings of this motor are each wound in the same direction, each creating and supporting a magnetic field of the same orientation, such that when current in winding $15_{12}$ drops, an increasing current is induced in winding $15_1$, which keeps the magnetic field from collapsing. Magnetically, it is a process whereby the energy stored in the magnetic field produced by winding $15_{12}$ is transferred to and supported by current instantly transferred to winding $15_1$ via the transformer effect. And after the initial transfer of current to winding $15_1$, current to sustain the magnetic field is supplied by the power source, which is connected to winding $15_1$ at the appropriate time by the microcontroller and the power circuits making use of rotor position-monitoring algorithms described below in the "Inductance Rotor Position Monitoring (IRPM)" section. Thus, using the rotor position-monitoring algorithms to determine when the rotor is in solid contact with laminations 14 (or 14A) between the two actuators, the micro-controller will shut off power to winding $15_{12}$ causing the induction of current in winding $15_1$, and at the same time connect winding $15_1$ to the power supply. As is explained in detail below in the "Motor Control and Power Electronics" section, detecting when the rotor moves into place over $14_1$ (bringing into play of the transformer effect), these circuits instantly shut down the current flowing into winding $15_{12}$, which instantly induces this same amount of current into winding $15_1$, shifting the magnetic flux (F1, F2, F3, and F4) created by winding $15_{12}$ forward to add to the magnetic flux already being created by winding $15_1$ ($15_1$ is switched on just prior to shutting off $15_{12}$). It should be noted that current is always "forwarded" to the next winding in sequence and never transferred backward to the previous winding, as the backward movement of current is prevented by the fact that the rotor is only touching $14_1$ and thus only creating a transformer effect between $15_{12}$ and $15_1$. It is not touching $14_{12}$, which would be necessary to create a transformer effect that would move current backward to the previous winding $15_{11}$.

This current forwarding occurs simultaneously at 4 locations around the stator surface of the motor. FIG. 5D shows a magnetic equivalent circuit for the entire motor at time T-2, showing the windings 15, actuator laminations 17, interactuator laminations 14, and an indication of the position of the rotor 4 where the transformer effect connecting windings is created—that is, where the Rotor touches the inter-actuator laminations 14. FIG. 5D shows transformers being temporarily formed between $15_{12}$ and $15_1$, $15_3$ and $15_4$, $15_6$ and $15_7$, and $15_9$ and $15_{10}$; enabling current forwarding in each case. A sudden collapse of current is not necessary for the transformer effect to work—it does work any time the amount of current on one side of the transformer changes, as it does when the current in $15_{12}$ is ramping down. Further, some transformer action takes place just prior to the rotor contacting $14_1$, helping to forward some current ahead of time.

The benefits of current forwarding are two-fold: (1) it helps maximize efficiency because the stored magnetic energy of the windings is not lost when each winding shuts off but rather moves forward to be used by the next actuator, and (2) using current forwarding makes it possible to achieve efficient high-torque operation at faster operating speeds. Normally motor torque is limited at higher motor speeds because of the length of time needed for current to "ramp up" to the levels needed for high output torque. This is because winding inductance limits the rate at which an electric current can increase through the windings; and, as motor speed increases, the length of time available to ramp up to full current gets shorter and shorter, limiting the peak current that can be achieved before the winding is turned off and the next winding turned on. However, in our FRM, the magnetic field is already present—the energy stored in that magnetic field simply "slides" forward, making it possible to efficiently produce large torque output as motor speed increases. Thus, the magnetic field and rotor move forward along the stator surface together, so that the stored energy in the magnetic field never dies away. To the best knowledge of the inventors, the Flex Rotor Motor is the only motor employing this scheme to efficiently achieve maximum torque output—output that is not reduced in proportion to increasing motor speed.

Electronic Control of the Flexible Rotor Motor/Generator (FRM/G)

While a traditional 3-phase controller might be used to run the FRM/G, the full benefits—optimal efficiency and maximum possible torque (or power) output—of the FRM/G will not be realized. First, precise timing based on rotor position feedback is critical to achieving optimal FRM/G performance. The FRM/G controller achieves this using Inductance Rotor Position Monitoring (see the "Inductance Rotor Position Monitoring" section below). A traditional 3-phase controller using a shaft encoder is not sufficient because rotor shape is constantly changing as it moves. Inductance monitoring is the only means of determining when the shape of the rotor is in the correct position over an actuator for the turn-on of that actuator. Second, a traditional controller cannot take advantage of the current forwarding capability of the FRM/G design, which maximizes efficiency and torque (or power) production; whereas the FRM/G controller is specifically designed to optimally implement current forwarding (see Current Forwarding section below). Third, special circuits not part of a typical 3-phase controller are required to implement regenerative braking and operation as a generator; whereas the FRM/G controller is designed specifically to optimally implement these two functions of the FRM/G (see sections "Regenerative Braking" and "Electronic Control of the Flexible Rotor Generator" below). Fourth, not only is the FRM/G Controller designed specifically for use with our motors and generators—the motor/generator it is an integral and necessary part of the controller: the actuator windings are inductive components necessary to the design and proper operation of our controller. Fifth, the FRM/G Controller monitors the amount of energy (current and voltage) being used to drive the motor precisely so that no energy is ever wasted. This adds greatly to the efficiency of the overall motor drive system, as well as the efficiency of the FRG (generator). Sixth, the FRM/G controller precisely controls torque (or power) output across a wide speed range, dynamically applying whatever torque is needed to maintain a specific speed, provide specific acceleration, or to hold the wheel (FIG. 1) or motor shaft (FIGS. 8 thru 10) perfectly still at a precise rotational position. Seventh, the FRM/G controller can either be controlled by (1) an external device providing controller inputs, or (2) software written and downloaded to the controller 51 to automatically run the motor (or generator) in a specific way when turned on. External control devices might include a joystick or other control interface responsive to manual manipulation, and would require a managing external microcontroller (50 in FIG. 6) to send control commands to the FRM/G Controller. The external microcontroller 50 may be set up to control more than one FRM/G controller in cases where, for instance, two to four FRM/G wheels of a vehicle are to be controlled; or perhaps two Flexible Rotor Motors of an X-Y positioning system.

Unique Flex Rotor Motor (FRM) Controller Design

Figure 6:
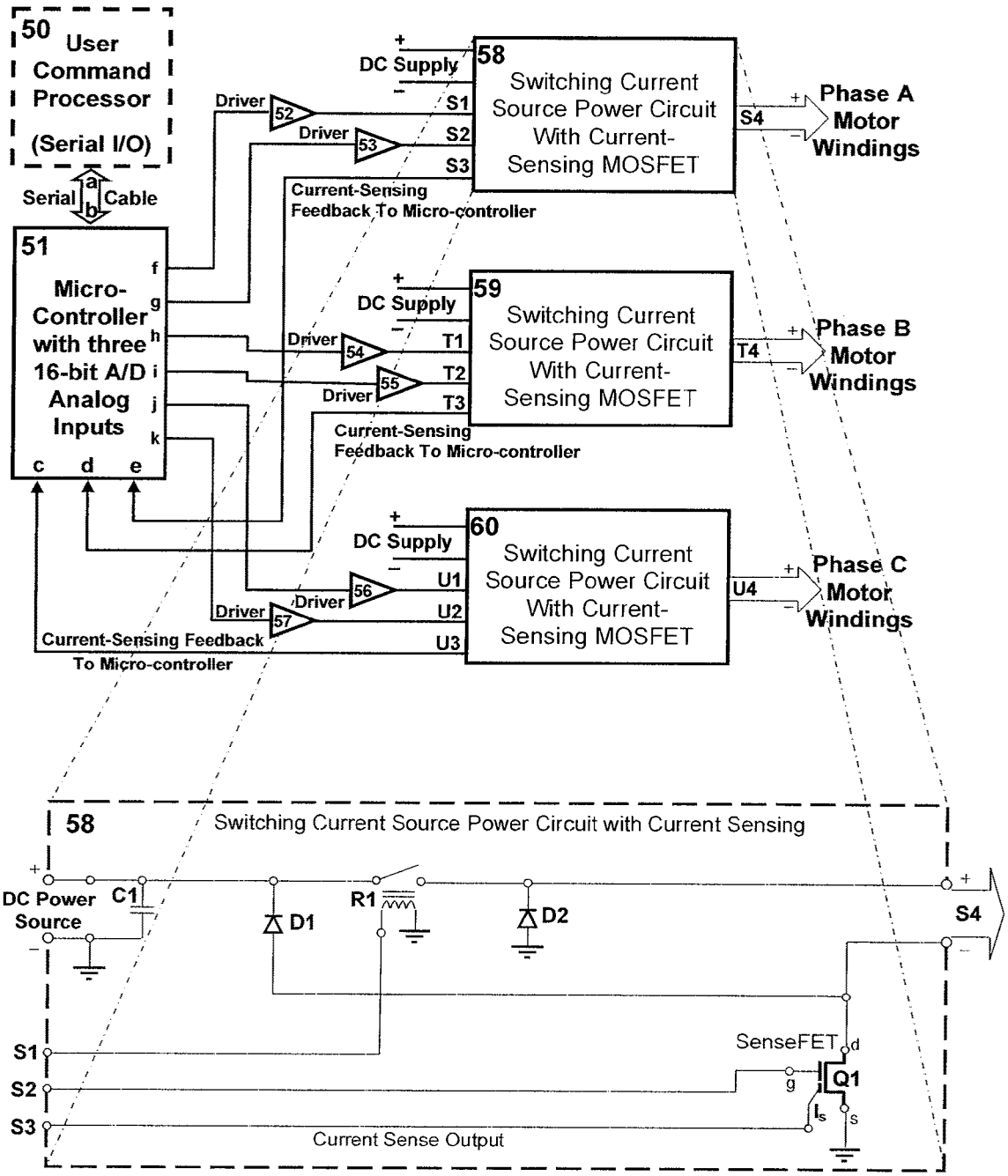
FIG. 6 is a motor controller block diagram with breakout of the energy storage and transfer (EST) power circuits.

FIG. 6 shows the FRM controller block diagram including a microcontroller 51, FRM/G power electronic circuits (58, 59 and 60), and a break-out diagram of 58 that is identical to 59 and 60 except for the input and output connections. All components of the FRM/G Controller are located on the two sets of printed circuit boards shown in FIGS. 1 & 2. S4, T4 and U4 are the power outputs of 58, 59 and 60 respectively and connect to winding phases A, B and C respectively with the positive (+) terminal of each power output being connected to the positive (+) terminal of the respective winding phase, and the negative (−) terminal of the power output being connected to the negative (−) terminal of the respective winding phase (see wiring diagrams in FIG. 5). As described above, each winding phase is comprised of a set of four series-connected actuators spaced at 90-degree intervals around the Stator. When the motor/generator is not in use the rotor band will snap into its normal circular shape and be held in place by at least two pads at the inner circumference of the motor/generator because the functioning stator is smaller than the non-activated, fully extended rotor as noted above. This fact is true except for the spring-like force that may aid in the rotation of the wheel rim see paragraph [0012]. The distance between this normal circular shape and the stator will be small enough for the stator to pull in the proper portions of the rotor. When the motor is started, the output of the power electronics circuit 58 will always switch on first, providing start-up power to winding phase A (Actuators $3_1$, $3_4$, $3_7$, and $3_1$) to put the rotor into the orientation shown in FIG. 1, with phase A actuators actively holding sections of the rotor against the stator surface at the four phase A actuator locations. These are the four low areas—areas where magnetic forces hold the rotor against the stator.

Each of the three FRM electronic power circuits (58, 59 and 60) is directly controlled by the microcontroller 51. This microcontroller can either be an 8-bit controller or a 16-bit controller, depending on the required complexity and speed of the specific motor performance algorithms; however, in either case, (1) it must have internal clocks capable of switching on and then off its control lines within 200 nanoseconds and (2) have three independent 16-bit A/D inputs. Further, for compiled software to carry out operational algorithms in real time, the microcontroller must operate at speeds of 20 MHz or higher. There is an optional user command processor 50 external to the Flexible Rotor Motor controller connected via a USB cable to provide control commands to 51, such as requests to maintain a specific speed, accelerate at a specific rate, etc. Motor status updates (i.e., current speed, acceleration, torque output, etc.) are provided back to 50 from 51 via this same USB cable. The external command processor 50 may, for instance, be a processor interpreting joystick commands for a wheelchair, or 50 may be connected to the accelerator pedal of a golf cart or other electric vehicle. If no external command processor is employed, then the microcontroller 51 may autonomously control the power electronic circuits (58, 59 and 60) to run the motor at a programmed speed, coming up to speed at a programmed rate of acceleration and applying programmed amounts of torque to the "wheel" (or axle) it is driving. In this case, turning on the FRM controller would bring the motor smoothly up to a set speed and provide torque up to a set maximum amount to maintain that speed. If required, a set speed can be maintained regardless of the amount of torque necessary to maintain that speed—that is, until maximum designed motor torque is reached.

Torque output is sensed and controlled using the current sensing feedback (S3, T3, and U3) provided by each of the electronic power circuits. Torque output is a function of the amount of current flowing in each of the winding phases and the position of the rotor. Average current sensed over an actuator-to-actuator force-wrap cycle is directly proportional to the average torque being produced. Over the period of a force-wrap cycle the torque produced versus instantaneous winding current varies in relation to the position of the rotor. This torque variation versus instantaneous winding as the rotor changes position is determined when the motor is manufactured and stored in a table in the microcontroller 51 so that the microcontroller can continuously calculate output torque from the current sensing feedback and rotor position information. Rotor position information is obtained using inductance monitoring, explained in detail below in the section "Inductance Rotor Position Monitoring (IRPM)." Using this information, and with 16-bit accuracy, the microcontroller 51 can adjust the amount of current supplied to the winding phases to achieve finely controlled torque output for situations where precise amounts of torque are to be delivered or the amount of torque precisely balanced between two drive motors (e.g., as for a rear-end transmission of an electric vehicle)—perfectly smooth torque output can be achieved at any motor speed from "creeping" to the top end. This type of torque control can also be used to "lock" the motor in position at any required location.

Precise speed control relies on responsive torque control adjustments and accurate speed measures. Speed is measured by the microcontroller 51 using position feedback that is obtained as described below in the "Inductance Rotor Position Monitoring (IRPM)" section. The microcontroller 51 continuously monitors speed by subtracting the previous measured position from the current measured position, and dividing by the time interval. This is done 60 times per second to insure responsive control. Each time the monitored speed is compared with a set speed target, and if the speed is too slow the controller immediately supplies more current to the winding phases to increase torque, and if the speed is too fast the controller immediately reduces current supplied to the winding phases to decrease torque. The microcontroller 51 monitors and controls acceleration by subtracting the previous speed measure from the current speed measure and divides by the time interval to calculate acceleration. This is also done 60 times per second to insure responsive control, and winding phase currents increased or decreased accordingly to achieve specific acceleration specifications or profiles.

It is important, for instance, in a wheelchair to use these methods to precisely control wheel speed and for the chair to smoothly accelerate to speeds selected by the user via the joystick control, and acceleration must be limited to amounts suited to the user's abilities. Further, when the user wishes to travel in a straight line, applied torque must be precisely controlled to keep both wheels turning smoothly at the same speed, especially when one wheel of the chair may be traveling on a smooth surface and the other on a rough surface, or when the chair is traveling across a sloped surface making one wheel work harder than the other to maintain a straight path.

Inductance Rotor Position Monitoring (IRPM)

Employing inductance rotor position monitoring (IRPM) to determine actuator turn on/off times is one means employed by the FRM controller (FIG. 6) to optimize efficiency, and is a unique feature of FRM controller. Precise timing of the turn-on and turn-off of each actuator in this motor is required to optimize efficiency. If actuators are turned on too soon, energy will be wasted, as this action will not produce motor torque efficiently. Torque produced per amp of current supplied to the windings of an actuator varies greatly with rotor 4 position. Every amp of current expended when the rotor is not in the ideal position to produce torque is wasted energy, as very little torque results. Further, if actuators are not turned off soon enough then a reverse torque will actually be produced that is counterproductive, wasting additional energy and slowing the motor speed. Precise timing of the turn on turn off of each actuator is thus necessary to optimize motor efficiency, because precise switching will optimize the amount of torque produced per amp of current expended in the windings.

IRPM provides the controller with the exact position of the rotor at any given time so that precise timing can be achieved. It is a function that serves multiple purposes lending efficiency to all of them. Knowing the position of the rotor at all times, the microcontroller 51 follows an algorithm that tells it exactly when to switch on and off each winding phase (A, B, and C) of actuators, and how much current to send to each winding phase to maintain smooth operation, desired motor speed, acceleration and torque.

IRPM is achieved through a design that senses the inductance changes in the actuators as the rotor is force-wrapped around the stator surface. When the rotor is touching the surface of an actuator, the inductance of that actuator's windings is very large. When the rotor moves away from an actuator's surface to form an "arch" above the actuator, the inductance of that actuator goes to a very low value. The inductance change as the rotor is wrapped from one actuator to the next is considerable—a 1000 to 1 change or more for the motor of FIG. 1, and is thus easy to detect. And, because this 1000 to 1 change occurs over a single actuator handoff cycle, the exact rotor position can be determined with great accuracy by sensing the inductance changes within each of the three series-connected winding phases (A, B, and C). The IRMP also can measure adequately a small delta of 1000 to 1 change and will be explained below.

For instance, looking at FIG. 4 T-1, the inductance of winding $15_1$ (one of 4 identical windings comprising phase C) is very high—in fact, it is at its maximum value with the rotor 4 in this same position over each of the actuator windings ($15_3$, $15_6$, $15_9$, and $15_{12}$) comprising phase C; while the inductance of winding $15_1$ (one of 4 identical windings comprising phase A) is moderately high, but comparatively lower than $15_{12}$ and of equal value to the inductance of $15_2$ (one of 4 identical windings comprising phase B). It should also be noted that the position of the rotor 4 with respect to each of the other identical windings in each phase in each case is the same, as is indicated in FIG. 5D. That is, when the rotor is being held against the surface of actuator $3_{12}$, making the inductance of $15_{12}$ very high; it is also being held against the surface of actuators $3_3$, $3_6$, and $3_9$, making the inductances of the other three windings comprising phase C ($15_3$, $15_6$, and $15_9$) very high—in fact, at their maximum value.

In like manner, the position of the rotor 4 with respect to each of the actuators ($3_2$, $3_5$, $3_8$, and $3_{11}$) comprising phase B will be identical; and the position of the rotor 4 with respect to each of the actuators ($3_1$, $3_4$, $3_7$, and $3_{10}$) comprising phase A will be identical. Further, note that the total inductance of each series-connected phase (A, B, and C) is simply equal to the sum of the inductances of the individual identical windings within that phase. Thus, the inductance of each winding phase (A, B, or C) is simply four times the inductance of any individual winding, and the inductance change of an entire phase is directly proportional to the inductance change of each individual winding within that particular phase; thus the summed inductance of each phase also changes by a factor of 1000 or more, and the position of the rotor 4 can be determined by monitoring the inductance of at least one of the winding phases (A, B, or C), and can be verified (double checked for accuracy) by monitoring the inductance of a second winding phase.

Continuing with the time sequence shown in FIG. 4, when the Rotor 4 moves to position T-2, the inductance of $15_{12}$ (along with the inductances of $15_3$, $15_6$, and $15_9$ comprising phase C) will decrease from their maximum inductance value to a moderately high inductance value, while the inductance of $15_1$ (along with $15_4$, $15_7$, and $15_{10}$ comprising phase A) will increase from a moderately low inductance value to the same, now moderately high inductance value, of $15_{12}$. At the same time the inductance of $15_2$ (along with the inductances of $15_5$, $15_8$, and $15_{11}$ comprising phase B) will fall to a very low value—in fact its lowest value, which is 1000 times smaller than its maximum inductance value.

Stating this in terms of the inductances of each winding phase, when the rotor 4 moves to the position shown in FIG. 4 T-2, the inductance of phase C will decrease from a high value (its maximum value) to a moderately high value, while the inductance of phase A will increase from a moderately low value to a moderately high. At the same time the inductance of phase B will fall to a very low value—in fact, its lowest value—as the "arches" of the rotor 4 are directly over the actuators of phase B at this time. Finally, when the rotor 4 moves to the position shown in FIG. 4 T-3, the inductance of phase C will decrease from a moderately high value to a moderately low value. The inductance of phase A will increase from a moderately high value to its maximum value, and the inductance of phase B will increase from its minimum value to a moderately low value that is equal to the moderately low value of phase C.

This movement of the rotor 4 to position FIG. 4 T-3 completes one actuator cycle. The changes in inductance described above will then repeat themselves in similar fashion for each actuator cycle of this Flex Rotor Motor as the rotor 4 wraps forward on the stator surface to sequentially come against the surfaces of each set of four actuators within each phase of the motor. That is, as the rotor 4 "force-wrapped" forward first covering phase A actuators, then phase B actuators, then phase C actuators, and then back to phase A actuators again, etc.

Sensing the changing inductances of the phase windings (A, B, and C) is accomplished by monitoring the rate at which current rises when a voltage is applied to the windings of a particular phase. The rate of current rise is directly proportional to the inductance of a winding, and can be measured in a 200-nanosecond time interval on any winding that is not already operating at maximum current. At the very least, two out of the three phases can always be monitored to determine the position of the rotor at any given time. To initiate a measurement, the microcontroller 51 switches on Q1 in power electronic circuit 58, 59, or 60 by respectively setting control line g, i or, k high, which turns on driver 53, 55, or 57 respectively to obtain a position reading using winding phase A, B or C respectively. When Q1 is switched on, it connects the power supply voltage to the selected winding phase. For 200-nanoseconds current increases at a rate proportional to the inductance of the selected winding, and then the respective control line is pulled back low, and Q1 turns off disconnecting the power supply from the winding. Q1, which is a SenseFET, is also the means by which the magnitude of the resultant current is measured. Q1 senses the current flowing through it and outputs an analog voltage proportional to the magnitude of that current. Q1's current-sense voltage is connected to the power electronics circuit output terminal S3, T3 or U3. A cable connects these output terminals to the analog to digital converter (ADC) input terminals c, d, and e (respectively) on 51's circuit board. At the end of the 200 nanosecond measurement time period, 51 commands the appropriate ADC input to "read" the analog current-sense voltage and convert it to a 16-bit number; and as soon as this current-sense value has been "read," 51 turns off Q1, shutting off the current. When the Flex Rotor Motor (or Generator) is fabricated, the inductance of each phase (rate of current rise with applied voltage) is measured versus rotor position. These measures are used to create this look-up table. Thus, in operation as the rotor turns, the microcontroller 51 compares current rise readings with values in this lookup table to determine the position of the rotor.

In general, the microcontroller 51 will initiate a reading of inductance for Phases that are not currently turned on. That is, it will take readings for one or both of the phases that are currently turned off. These are the phase windings where inductance will be changing the most, where there is still an air gap between the rotor and an actuator surface below. At locations where the rotor actually touches the surface of an actuator, the inductance has very nearly reached its peak value and does not change considerably as the rotor comes completely down onto an actuator after initially touching part of its surface. Thus, the winding inductance changes of inactive windings actually provide the best indication of rotor position and movement.

The microcontroller 51 also determines when and how often readings are taken as the rotor turns. The number of readings per second increases as the motor speed increases, but will never be less than 60 readings per second even when the rotor is stationary. Further, the number of readings during an actuator-to-actuator "handoff" cycle will never be less than 30 readings at any motor speed. This continuous position update rate makes it possible for the microprocessor 51 to very responsively and continuously adjust winding currents to (1) maintain solid motor speed control despite the influence of outside forces, or (2) magnetically "lock" the rotor in place despite changing outside forces that might otherwise act to make it turn.

This position-monitoring process consumes very little power, as the current does not have time to rise to a significant value in just 200 nanoseconds. And this does not add significant "overhead" in terms of 51's ability to handle complex performance algorithms. For example, at 600 rpm, the wheel of FIG. 1 will be turning at 10 revolutions per second—180 magnetic rotations, or 12×180=2160 actuator-to-actuator "handoffs" per second. At 60 readings per "handoff," that is 129,600 position readings per second—more than enough to guarantee very precise speed and acceleration control; yet the "overhead" time is minimal: 129,600 readings at 200 nanoseconds each is just 25.92 milliseconds (0.02592 seconds) used out of a second, leaving the far greater part of a second to carry out other complex control algorithms.

Flex Rotor Motor (FRM) Power Electronic Circuits

As described briefly above, each winding phase (A, B and C) of the FRM is driven by a power electronics circuit (58, 59 and 60 respectively) designed specifically to efficiently run and take advantage of all the FRM's capabilities, including: (1) current feedback control of motor torque, (2) inductive rotor position monitoring (IRPM) for the purposes of optimally timing the turn-on and turn-off of actuators to achieve high efficiency, (3) current forwarding as described above, and (4) regenerative braking/power generation.

The power circuitry is actually very simple in design, employing (1) a DC power supply (e.g., batteries), (2) a capacitor C1, (3) solid state relay switch R1, (4) a SenseFET MOSFET Q1, (5) diode D1, and (6) diode D2. A DC power source is ideal for this motor-controller design. If AC power is employed then additional power circuitry will be required to convert the AC source to a stable DC power source capable of supplying desired current to the motor. Such AC-to-DC power circuits are readily available, so will not be discussed as part of this patent.

The solid state relay R1 is switched on by microcontroller 51 (line f, h, or j) via a line driver (52, 54, or 56 respectively) to provide power to a power electronics circuit (58, 59, or 60 respectively) associated with a particular winding phase (phase A, B or C respectively). R1 can also be used to initiate regenerative braking. Switching R1 off while the motor is turning initiates regenerative braking. This is described in more detail below. When R1 is switched on it enables operation of SenseFET Q1, a power MOSFET with current-sensing capability. Turning on the SenseFET Q1 in one of the Power Circuits 58, 59, or 60 connects the power supply to directly to a winding phase of the motor (A, B, or C respectively). Microcontroller 51 controls each SenseFET Q1 of 58, 59, and 60 via control lines g, i, and k respectively, switching Q1 on and off as desired by raising control lines g, i, or k high to turn on the respective Q1, and pulling each of those lines low to turn off each respective Q1. Turning Q1 on or off connects or disconnects the power supply from a selected winding phase. Doing this, the microcontroller 51 maintains control over the amount of current flowing in selected winding phases. As a SenseFET, Q1 also provides current feedback through lines S3, T3, and U3 to 51's 16-bit A to D inputs c, d, and e respectively. The purpose of capacitor C1 is to stabilize the power source voltage when Q1 turns on and suddenly increases the demand for current from the power supply. The phase winding inductances will limit the actual instantaneous current draw so that C1 alone is adequate for voltage stabilization purposes, though the size of C1 will be dependent on the actual winding inductance and resistance, as well as the type of power source employed.

Diode D1 acts as a commutating diode for winding phase when Q1 turns off. This commutating diode is typical of most motor drive circuitry. It allows the current within a winding to continue to flow for a time when a switching current source is turned off. This diode D1 makes it possible to use a switching device to smoothly control the amount of current flowing in the windings of a motor via pulse width modulation (PWM), as D1 provides a current path through which the winding current can continue to flow when Q1 turns off for a short time during the PWM cycle. Diode D2 acts as a regeneration diode in conjunction with D1 when the motor is turning and relay R1 is turned off. If there is current flowing in the windings when R1 turns off, then this current can continue to flow into the power source through D1 and back into the winding through D2. This is explained in greater detail in the regenerative braking section.

Using just these few power circuit components, the microcontroller can perform all its designed functions: (1) run the motor at any desired speed and torque of which the motor is capable, (2) determine the exact time to turn on and turn off each phase of the motor to achieve optimal running efficiency, (3) perform the current forwarding function, and (4) control regenerative braking of the motor and/or power generation.

Power Electronics Circuit Operation

The power circuit, as controlled by microprocessor 51, functions as a Pulse-Width-Modulated (PWM) current source when running the motor, and for best efficiency in most applications would operate at a frequency of 100 kHz, though it could easily be run at a higher frequency to achieve motor currents that are more ripple free. Ripple free currents are desirable to reduce RFI and EMI radiation—a concern when very large motor currents are required. However, higher PWM frequencies also reduce the efficiency of the switching MOSFET and/or demands the use of higher-cost MOSFETS, thus there is a design tradeoff to consider when designing a specific controller for a specific application, and there is no reason to use them in general purpose motors, as a controller operating at 100 kHz PWM frequency can very quickly respond to changing dynamic conditions to maintain desired motor speed and torque.

Thus, for this patent, we describe a controller employing a PWM frequency of 100 kHz. At this frequency, the Microcontroller 51 turns Q1 on and then off again 100,000 times per second, or once every 10 microseconds. The minimum "on" time (pulse width) is limited by the actual turn-on/turn-off time of Q1. The maximum "on" time is 10 microseconds, the complete length of the switching interval—a 100% duty cycle. A 100% duty cycle simply means that Q1 is not switched off before the end of the switching cycle, something that would occur when attempting to bring the winding current to maximum current as quickly as possible. This would be the case when bringing the motor quickly up to running speed or when providing maximum torque at running speed. Once the motor is at the desired running speed, the duty cycle would be adjusted to provide the required current to keep the motor running at the desired speed and torque.

For a general-purpose motor, we select a MOSFET with a 10% to 90% turn-on/turn-off time of 50 nanoseconds, which provides a reasonable efficiency versus cost tradeoff. Thus, when the microcontroller 51 switches the gate line (f, g, or h) high, 50 nanoseconds later Q1 will be nearly fully turned on and current will be increasing in the windings controlled by Q1. And, when 51 switches the gate line (f, g, or h) off, then within 50 nanoseconds Q1 will be nearly fully turned off. This 50 nanosecond turn-on/turn-off time (totaling 100 nanoseconds) sets the minimum possible width of the PWM on-pulse to 100 nanoseconds out of its maximum potential width of 10 microseconds (10,000 nanoseconds). Thus, the minimum possible duty cycle of this PWM controller is 100 out of 10,000 nanoseconds, or 1%. However, operating at this 1% duty cycle would keep Q1 in its active region a majority of the time. Operating a MOSFET in its active region is a very inefficient way to operate, and creates a great deal of heat. Thus the minimum duty cycle used will be 5% (a 500 nanosecond pulse width) when supplying operating current to the motor for torque production; and a 2% duty cycle (a 200 nanosecond pulse width) used for inductance rotor position monitoring (IRPM) where minimal current is used.

Controlling Operation of the Power Electronics Circuits

The microcontroller 51 directly controls all operational modes of the three identical power circuits (58, 59 and 60). The break out of the "Switching Current Source Power Circuit with Current Sensing" at the bottom of FIG. 6 shows the circuitry contained in each of the three blocks (58, 59 and 60) at the top. This is called a "Current Source" power circuit because current feedback from the SenseFETs is used to adjust the PWM duty cycle to make the circuit act like an adjustable current source for the winding phases. Each of these power circuits is connected to the plus (+) and minus (−) terminals of a DC power supply (e.g., storage batteries), which supplies all the power used to run the motor. Outputs (f, g, h, i, j, and k) from 51 connect to line drivers (52, 53, 54, 55, 56, and 57 respectively), which in turn drive inputs (S1, S2, T1, T2, U1 and U2 respectively) to control the operation of each power circuit. When the microcontroller 51 raises output f, h, or j high, this places a voltage on driver 52, 54, or 56 respectively that is connected to power circuit input S1, T1 or U1 respectively, which turns on relay R1 in power circuit 58, 59 or 60 respectively. Turning on relay R1 makes power available to Q1 for running the motor. All relays R1 must be turned on before the motor can run. When the microcontroller 51 raises output g, i, or k high, this places a voltage on driver 53, 55, or 57 respectively that is connected to power circuit input S2, T2 or U3 respectively, which turns on SenseFET Q1 in power circuit 58, 59 or 60 respectively. When relay R1 has already been turned on, then turning on Q1 connects the DC power source voltage to power circuit outputs S4, T4 or U4 respectively. The plus (+) and minus (−) output terminals of each power circuit (S4, T4 and U4) are wired to the plus (+) and minus (−) terminals of winding phases A, B and C respectively. Thus, when relay R1 has already been turned on and 51 raises output g, i, or k high, then the power supply voltage is applied to phase winding A, B, or C respectively. Power circuit output terminals S3, T3, and U3 are connected to their respective Q1's current sensing output IS, which provides a voltage proportional to the amount of current flowing through Q1. S3, T3, and U3 are connected to microcontroller 51 input terminals c, d, and e respectively, which are 16-bit analog to digital converters. Thus, when the microcontroller 51 pulls an output (g, i, or k) high to connect the power supply to winding phase (A, B or C), it can monitor the amount of current flowing through the winding phase and respond accordingly, following its programming to carry out motor control algorithms. When it is time to turn off current to that winding phase, it pulls the respective output line (g, i, or k) low, which turns off the respective Q1 disconnecting the winding phase from the power supply.

Employing the above-described control lines (f, g, h, i, j, and k) and inputs (c, d, and e), software algorithms running in the microcontroller 51 control the power electronics to efficiently implement all of the above-described motor features: (1) pulse width modulation (PWM) of power supply voltage applied to winding phases, (2) current monitoring and control, (3) torque monitoring and control, (4) rotor position monitoring and control, (5) rotor speed monitoring and control, (6) rotor acceleration monitoring and control, (7) current forwarding, and (8) regenerative braking.

Pulse width modulation. PWM is accomplished using a pair of the microprocessor's programmable timers. Timer one is set to interrupt the processor once every 10 microseconds, and timer two is adjusted dynamically by software to time out over a range from 0.5 microseconds to 10 microseconds to implement a duty cycle range of 5% to 100%. At the start of a PWM duty cycle timer two is set by software to the required duty cycle time, an output line (g, i, or k depending on which winding phase is currently "turned on") is brought high to turn on the appropriate Q1, and both timer one and timer two are started. When timer two times out, the microprocessor is interrupted and sets output line (g, i, or k) low again, turning off Q1. When timer two times out, the microprocessor is interrupted again and the entire process is repeated. The turn-off of Q1 when timer two times out disconnects the power supply from the winding phase, but it does not stop the flow of winding current because diode D1 acts a commutating diode providing a route for current flowing out the negative terminal of the winding to flow through relay R1 back into the positive terminal of the winding. Thus, over a period of at most 9.5 microseconds (for a 5% duty cycle) the current drop—in essence the current ripple—is minimal. The net effect is that of applying a voltage to the windings that is a percentage of the power supply voltage equal to the duty cycle percentage of the power supply voltage.

Current monitoring and control. Current monitoring is achieved by converting the analog current-sense voltage connected to inputs c, d, and e to 16-bit digital values. A conversion table stored in 51 is used to convert the digital voltage value to a current value. Current control is achieved using a software algorithm that keeps track of how much the current in a winding changed during the last PWM duty cycle and uses this to calculate the percent duty cycle needed to bring the current up (or down) to the target current. If this percentage is greater than 100% (or less than 0%), then a 100% (or 0%) duty cycle is employed for the next duty cycle, and then the calculation and process repeated until the target current is reached. When a winding phase is first turned on, a 100% duty cycle is selected to start the process. Using this algorithm, target current is reached as quickly as possible given the available Power Supply voltage.

Torque Monitoring and Control. Torque monitoring is achieved by converting current measurements (see above) into torque measurements using a lookup table. When a motor is constructed, measures of output torque versus winding phase input current versus rotor position are made and recorded. These are placed into a look-up table for use by the microprocessor 51. Thus the current monitoring methods described above are employed, using this look-up table, to monitor motor torque. Torque control is implemented employing a software algorithm that keeps track of how much the torque produced by in active winding phases changed during the last PWM duty cycle, and uses this to calculate the percent duty cycle needed for each active winding phase to increase (or decrease) torque to reach a target torque value. If this percentage is greater than 100% (or less than 0%), then a 100% (or 0%) duty cycle is employed for the next duty cycle, and then the calculation and process repeated until the target torque value is reached.

Rotor Position Monitoring and Control. This is accomplished using one of the microprocessor's interrupt timers, timer. First, timer is set to time out in 200 nanoseconds. Then, for a winding phase that is not active—where PWM is not being used to supply current to the winding—the appropriate driver line (g, i, or k) is brought high to turn on Q1 in the respective power circuit (58, 59, or 60), and timer is started. When timer times out, it interrupts the microprocessor 51. The microprocessor's interrupt routine immediately converts the respective current-sense voltage to a current measure—a measure that is equal to the amount of current rise in the winding over a 200 nanosecond interval. As part of the manufacturing process, the motor is run and Rotor position recorded versus the measured values of current rise during these 200 nanosecond measurement intervals. This is placed in a look-up table in the microprocessor 51 for reference in determining rotor position versus measured values of current rise. These measurements are made 60 times per second when the rotor is standing still, and more often when the rotor is moving so that 30 measurements are made over the interval of time taken for the rotor to be wrapped forward from one actuator to the next. The rotor can thus be actively and tightly held in any location using whatever motor torque is required—up to the maximum available from the motor—to keep the rotor "locked" in place. If an external force causes the rotor to move more than one-thirtieth of the distance between one actuator and the next, then the microcontroller 51 algorithm monitoring position will respond within 10 microseconds by applying counter-torque—using the torque control algorithm described above—to move the rotor back into position. This torque can be applied in either a clockwise or counter-clockwise direction, as needed, by turning on an actuator in either the clockwise or counter-clockwise direction from the current rotor contact location on the stator.

Speed Monitoring And Control. Rotor contact speed monitoring is accomplished using the results of rotor position Monitoring. The last recorded rotor position is subtracted from the current recorded position and this result is divided by the time interval between recorded positions to obtain the current rotor contact speed—the speed at which the rotor contact positions on the stator are moving forward around the stator surface. Motor (wheel or shaft) speed is then determined using the gear reduction ratio (Eq. 1 or Eq. 2). Speed control is managed with a software algorithm running in the microprocessor 51 that compare current speed with target speed and employs the torque control algorithm to increase (or decrease) torque in proportion to the difference between current speed and desired speed. If maximum allowable torque values have been specified, then the torque-monitoring algorithm will be used to limit the amount of torque applied to reach and maintain a target rotor speed. This would be implemented on wheelchair systems to prevent injuries.

Acceleration Monitoring and Control. Rotor acceleration monitoring is accomplished by using the results of rotor speed monitoring described above. The last recorded speed is subtracted from the current recorded speed and this result is divided by the time interval between recorded speeds to obtain the acceleration. Acceleration control is managed using the fact that acceleration is directly proportional to torque output. To reach target acceleration, a feedback loop controlling torque is established as an algorithm whereby torque is increased to reach a target acceleration greater than the current acceleration value, and decreased to reach an acceleration target less than the current acceleration value. If maximum allowable acceleration values have been specified, then the acceleration-monitoring algorithm will be used to limit the acceleration to a specific amount.

Current Forwarding Timing

Current forwarding is completely controlled by the microcontroller 51. Precise timing is required for the current forwarding mechanism to work efficiently. Optimal efficiency occurs when the rotor 4 is in the position shown in FIG. 4 T-2. Using rotor position monitoring, as described above, the microcontroller 51 determines when the rotor 4 is in this optimal position (shown in FIG. 4 T-2) for current forwarding to take place. When rotor position monitoring indicates the rotor is in the correct location for current forwarding, the microcontroller 51 must simultaneously do two things: (1) apply full voltage (100% duty cycle) to the phase winding that is to receive the forwarded current and (2) apply a 0% duty cycle (e.g., turn off Q1) in the power circuit connected to the phase winding that is transferring current forward to the next phase winding.

While this transfer of current to the next winding phase is most efficient when the rotor is exactly in the position shown in FIG. 4 T-2, some current is transferred as the rotor approaches this ideal position if current in the winding phase being turned-off is falling prior to turn-off, which is indeed the case. Between rotor position T-1 and T-2 the current in the winding turning off must be reduced to allow the rotor 4 to move into position T-2. In fact, at the T-2 position current in this winding phase must have decreased to 50% of its peak value, while current in the winding phase being turned on must have risen to 50% of its eventual peak value. The process of increasing current to 50% in the winding being turned on is aided by some forwarding of current taking place as the 50-50 position is approached.

This "crossover" process where the rotor 4 is moved into position T-2 is managed by the microcontroller 51, which uses its current control algorithms to ramp down current in the winding being turned off and proportionately ramp up current in the winding being turned on. Speed and torque monitoring algorithms (as described above) are used to maintain smooth rotor speed and torque while ramping down current in one winding and ramping up current in the next. As the rotor moves toward the ideal position for current forwarding, an increasing transformer effect takes hold, transferring current forward with ever-increasing efficiency as the rotor approaches the T-2 position. When the rotor 4 reaches the T-2 position the winding phase being turned off is completely cut-off from the power supply source (Q1 for that winding phase turns off) and its current drops quickly. This quickly dropping current then, via the transformer effect, induces and equal amount of quickly rising current in the winding phase being turned on. As a result, current in this winding phase quickly rises to its peak value and the rotor 4 is pulled into the T-3 position shown in FIG. 4. The process then begins again, moving the rotor forward to transfer the current forward to the next winding phase (set of actuators in sequence).

The purpose of applying a 100% duty cycle at time T-2 to the winding phase being turned on is to insure that the current being transferred into this winding phase is fully supported by the power supply voltage applied to that winding. If this were not the case, then the electrical resistance of the phase winding would soon dissipate any forwarded current not fully supported by the power supply. A certain amount of voltage is required to maintain "steady state" current in the windings. The process of current forwarding actually becomes more efficient when the rotor is turning at a moderate to high speed, because the momentum of the surrounding wheel carries the rotor 4 forward to the ideal position for current forwarding. This means that currents in the turning-off winding phase need not ramp down as much, and current in the winding phase turning on need not ramp up as much prior to the T-2 position. Thus, at the T-2 position the majority of current can be efficiently and quickly transferred forward. This gives our motor an advantage at high speeds, as unusually large amounts of current can be quickly forwarded from winding phase to winding phase to efficiently produce large torques at high motor speeds.

Regenerative Braking

The mechanism developed by the inventors to make the Flex Rotor Motor perform regenerative braking when desired is tied to the operation of relay R1, SenseFET Q1, and the use of current forwarding. For regeneration to be initiated, first, some "seed" current must be flowing in at least one of the winding phases. This is needed to establish a magnetic field in the actuators of a particular winding phase at the time the rotor 4 is lying against the surface of those actuators (e.g., as in FIG. 4 T-1). This is the time when the inductance of those actuators (e.g., A3, A6, A9, and A12) is at a maximum, and the current for a typical FRM running state has reached its peak value. This is the point at which regeneration, when commanded by the user command processor 50, is initiated by the microcontroller 51. That is, when 50 signals 51 to initiate regenerative braking, then 51 continues operating as usual for a very short time to keep the rotor 4 moving until it is in this optimal position (e.g., the position shown in FIG. 4 T-1). Then 51 put the associated power circuit into regeneration mode by turning off Q1 and opening relay R1. When both Q1 and R1 are turned off, the only path available to current flowing out of the winding phase is one that starts where current flows out of the negative contact of the winding phase, goes through diode D1 to the positive DC power source, then through the DC power source to ground and then from ground up through diode D2 and back into the positive terminal of the winding phase. As long as the breakdown voltages of R1 and Q1 are greater than the voltage of the DC power source, this is the direction that current will flow, as at the start of this process the inductive action of the windings will produce whatever voltage is needed to keep the current flowing through the windings and through the power supply.

Once this process is initiated, then the force (or momentum) of the wheel (or other device being driven by the shaft) forcibly wraps the rotor 4 forward, pulling it away from the surface of these actuators (e.g., A3, A6, A9, and A12). As the rotor 4 is pulled away from the active actuator surfaces, the inductance of those actuators drops suddenly and drastically by a factor of at least 100 to 1, if not 1000 to 1 as the rotor moves away from the stator. This is the mechanism by which the energy of motion is converted to electrical energy, and it results because the magnetic energy stored in the actuators cannot abruptly change when the inductance is mechanically forced to change.

Here is the reasoning behind this. By definition, the energy stored in the magnetic field of an inductor (i.e., the actuators comprising a winding phase) is equal to the square of the current flowing in the inductor times its inductance, as represented by the following equation:

$$E = I^2 h \qquad \text{Eq. 3}$$

Here E=Energy, I=Current and h=inductance. Because the stored energy cannot suddenly change when the inductance suddenly changes, the current in the windings must increase to compensate for the decrease in inductance. Thus, with a sudden reduction of inductance the current must increase according to this equation:

$$I_{Regen} = I_{Seed} \sqrt{\frac{h_{Max}}{h_{Min}}} \qquad \text{Eq. 4}$$

Here: $I_{Regen}$=Regeneration Current, $I_{seed}$=Seed Current, $h_{Max}$=Inductance Maximum, and $h_{Min}$=Inductance Minimum. For example, if the seed current (the current flowing in the windings when Q1 is shut off and R1 opens) were 1 amp and the inductance maximum to minimum ratio was 400 to 1, then the regeneration current would peak at 20 amps. Assuming a linear change of inductance, an average of 10 amps of regeneration current would be produced over the period of time the rotor 4 moved from the T-1 to the T-3 position. These 10 amps of current is being pushed into a power supply—perhaps a battery stack. If that were a 24-volt battery stack, then the amount of power being generated would be 24 volts× 10 amps=240 watts=240 joules per second. The number of joules per second indicates the rate of deceleration (e.g., braking) of the vehicle—according to the formula $E=0.5 MV^2$. For instance, according to this formula, a 2400 kg vehicle moving at 2 meters per second has an energy of 0.5×2400×22=4800 joules=4800 watt-seconds. Braking at a rate of 240 watt-seconds per second, the vehicle would be stopped in 20 seconds. The actual amount of braking would be controlled by the user command processor 50, which in a passenger vehicle would be linked to the brake pedal for driver control of the braking used to slow the vehicle. Given a desired amount of braking, the microcontroller 51 would either increase or decrease the amount of current "seeded" into the windings to start the process.

Once the process is initiated, the amount of current forwarded to the next winding phase controls the braking force—the amount of power being generated. The "Seed Current" mentioned above is only necessary to start the regeneration process. Once the regeneration process is producing current, then current forwarding is employed to efficiently move current into each subsequent winding phase to maintain the process. This is accomplished by taking advantage of the fact that the regeneration current peaks at position T-2, and then begins to decline. Position T-2 is also where the transformer effect peaks and then declines as the rotor approaches position T-3. At position T-2, because of the transformer effect, and the falling regeneration current, some current can be transferred forward to the next winding phase to "seed" it just prior to the rotor moving into position to generate power from that winding phase. Current forwarding is activated by turning on Q1 for this next winding phase, which sets up a closed path for current flow through it—a path that flows from its negative terminal down through Q1 to ground, and then up from ground through D2 and into its positive terminal.

The timing of turning on Q1 is critical to the amount of current that is transferred forward. If the transfer is initiated too late, then the rotor may have moved to a location where the weakening transformer effect cannot transfer sufficient current to sustain the desired level of regeneration. The amount of current forwarded, and thus the amount of power regenerated and amount of braking, is controlled by this timing. Slightly delaying the turn on of Q1 lowers the amount of seed current transferred, decreasing the braking effect to less than maximum. This process is then continued, using current forwarding, to transfer current into subsequent phase windings until either the motor stops, or regenerative braking is turned off. Rotor position monitoring, as described above, is used by the microcontroller 51 to insure correct timing of the process for each of the three phase windings. Further, current monitoring of the amount of seed current being forwarded provides an indication of the amount of braking torque being applied, for instance, to the wheel of a vehicle so that a selected amount of braking by the user command processor 50 can be maintained by the microcontroller 51.

Electronic Control of the Flexible Rotor Generator (FRG)

Basically, when operated specifically and only as a generator, the controller operates in much the same way as described above for regenerative braking. However, the generator configuration, as shown in FIG. 7, is mechanically specific to the operation of the FRG, as opposed to an FRM. The purpose of the "lifters" (FIG. 7A) is to pull the rotor belt away from the stator surface and hold it far enough away from the stator surface to maximize the inductance change of the affected actuators of a winding phase. Maximizing the inductance change maximizes the amount of power than can be generated (see Eq. 3). The tip-to-tip length of the lifters is set to optimize the rotor contact position for current forwarding at a time when the output from the current winding phase begins to drop, so as to optimize the current forwarding process and maintain consistent and controllable power output. This provides for smooth initiation of current generation from the next phase so that the ramp up of current generated by the next phase matches the ramp down of current from the current phase, keeping total current output constant.

In terms of microcontroller 51 operation, rotor position monitoring, as described above, is used to insure correct timing of current forwarding for each of the three phase windings. Further, current monitoring of the amount of seed current being forwarded provides an indication of the amount of power being supplied as well as the "braking torque" being applied to the shaft. For windmill operation this is important, as manipulation of the "braking torque" associated with power generation is the means by which shaft speed can be controlled, and low-speed wind sources accommodated. That is, using speed monitoring, as described above, the microprocessor 51 can use "braking torque" as a means to optimize shaft speed so the FRG can continue generating power as wind speeds vary—capturing every bit of energy available despite wind gusts and slowing winds at times. The microcontroller 51 handles wind gusts by monitoring shaft speed, as described above, and increasing "braking" torque to maintain a constant shaft speed during the gust. This allows the generator to efficiently capture the energy of the gust, providing additional output power at these times. During a lull in the wind, the microcontroller decreases "braking" torque to keep the shaft turning and continuing to generate current output, albeit at lower levels. Some windmill systems employ expensive pitch-correcting windmill blades to accomplish the same result. This is not necessary when using the FRG.

Generator Start-Up. To initiate the generation of power, current must first be "seeded" into one of the winding phases using the process described above in the regenerative braking section. Thus there must be at least a small external power source available for generator start-up. The inventors suggest the use of a small storage battery for this purpose that would be pre-charged when installed, and kept charged by the power generated by the system (e.g., windmill). A transmission clutch is not needed for this process, as the generator shaft will be easy to turn prior to initiation of current generation, and the microcontroller 51 is programmed to gradually increase generation power (and reverse shaft torque) up to maximum generating power. In fact, the FRG can act as a magnetic "clutch" to allow the gasoline motor of a gasoline generator to start and come up to speed while slowly applying an increasing load to the gasoline engine until the engine is running at optimal speed and torque for efficient production of electric power. The user command controller 50 can be programmed to accomplish this given the characteristics of the gasoline engine, or other mechanical driving source. The user command controller 50 need only provide the microcontroller 51 with updated reverse torque ("braking") data until the engine is up to speed and operating in its most efficient range. The FRG control strategy is to provide this "reverse torque" by using Q1 to forward an increasing amount of current into sequential phase windings as the mechanical source is coming up to full speed and torque. Therefore the use of a FRM/G for a wind turbine does not require any other mechanism to start or continue to function as a wind turbine besides the controller that is built into the FRM/G. No matter how the wind pattern changes, whether it is a gust up to the point of damaging the structure or a practically dying wind pattern and it can re-energize itself when the wind picks up. If the wind dies completely for some period of time, the microcontroller 51 software will restart the generator when it senses that the wind has picked up again.

When the generator is constructed, it will be characterized to determine what speed and shaft torques will produce optimal generator efficiency. The microcontroller 51 will then attempt to operate the generator as close to that maximum efficiency as possible given the input torque and speed of, say, a windmill shaft. If the mechanical source has an optimal speed of operation and torque output, then a generator can be designed to match that optimal speed and torque so that the efficiency of the overall system is optimized. Thus an FRG generator can be designed for optimal use with a gasoline engine, for instance, or optimal use with a windmill, or other mechanical source. Further, such customization completely eliminates the need for any kind of transmission, gear reduction, or clutch system. The FRG can be directly connected to the shaft of the power source regardless of what that power source might be.

The microcontroller 51 will calculate the amount of torque being applied by the windmill (or other) shaft based on the amount of current being generated. The greater the current produced, the greater the applied torque of the windmill shaft. The exact values will be known after characterizing the FRG when manufactured. This information will be included in a data table in the microcontroller 51. To attain a specific optimal torque and speed the microcontroller 51 will adjust the amount of current being forwarded from winding phase to winding phase as described above. When less current is forwarded, less power will be generated requiring less torque to turn the shaft, and thus the shaft will speed up. Generated power can be fed directly into a DC power grid; or into a bank of storage batteries, or super capacitors, or an inertial storage medium, etc., when AC power output is desired. External power electronics circuits would then be used to convert the stored DC power into a desired form of AC power. Because the current generated goes into the power grid, which will always be tracked by a meter, or other storage medium, even small amounts of generated current are useful. Further, a number of windmill generators can feed energy into a single storage bank (stack of batteries, etc.) so that a single power circuit can convert that stored energy into either single phase or three-phase line current.

The invention claimed is:

1. A rotary apparatus for an electric motor or a generator each having a rotor and a stator with a working surface comprising a flexible rotor having a circumference where: (1) said flexible rotor is a spring-like magnetically permeable band that circumscribes the working surface of the stator and said stator has a circumference and sets of stator windings, (2) said flexible rotor differs in circumference from the stator surface it circumscribes, having a smaller circumference than the stator circumference when the working stator surface facing the rotor is concave and a larger circumference than the stator circumference when the working stator surface facing the rotor is convex, (3) when current is directed through sets of stator windings to produce magnetic poles at equally-spaced locations around the stator surface, regions of the flexible rotor closest to these magnetic poles are attracted to and brought into solid contact with the stator surface, and each region of the flexible rotor between these contact locations springs away from and forms an arch above the stator surface as a result of the difference in rotor and stator circumferences, (4) when stator windings are driven in typical motor operation fashion by either an alternating current source or switching circuitry to advance the location of the stator's electromagnetic poles forward around the circumference of the stator surface, regions of rotor stator contact move forward around the stator surface following the advancing positions of the magnetic poles, and the flexible rotor is force-wrapped around the stator circumference, (5) as the rotor is force-wrapped around the stator, the rotor and stator circumferences difference causes all points of the rotor to rotate around its center by an incremental amount proportional to the circumference difference between the rotor and stator, (6) wherein a flexible rotor motor is produced by mechanically linking movement of the flexible rotor to either (a) a surrounding wheel or (b) a central rotating shaft, or (7) a flexible rotor generator is produced by (a) injecting a small seed current into stator windings to attract the flexible rotor to the stator surface, then (b) mechanical forces are applied to separate the rotor from the stator surface and convert the applied mechanical energy to increased magnetic field energy associated with the stator windings, and then (c) the increased magnetic energy is harvested from the stator windings, converting said magnetic field energy to electrical energy.

2. The apparatus of claim 1 wherein:
the flexible rotor being magnetically force-wrapped around the stator surface provides a gearing ratio to the flexible rotor motor/generator, said gearing ratio defined as the speed at which points on the body of the flexible rotor rotate around the center of the rotary machine to the speed of rotation of the rotor-stator magnetic contact regions that force-wrap the flexible rotor around the circumference of the stator;
when either a central rotating shaft or surrounding wheel is mechanically tied to points on the body of the flexible rotor, then said shaft or wheel will rotate according to said gearing ratio; and
the gearing ratio is a function of the rotor and stator circumferences difference and the rotor circumference, and is equal to 1 minus the rotor and stator circumference difference divided by the rotor circumference.

3. The apparatus of claim 1 in which the flexible rotor is used to turn a surrounding wheel via direct rolling contact, where: (8) a convex stator is employed so that the working surface of the stator faces outward, (9) the flexible rotor circumscribes the outward-facing working surface of the stator with a circumference that is greater than the stator circumference, (10) a wheel rim with a cylindrical inner surface having a diameter and the width of the flexible rotor band surrounds the stator and the flexible rotor, (11) the stator is locked to a central non-rotating axle and the wheel rim is supported by a pair of disc-shaped wheel hubs placed on either side of the stator that rotate on bearings around the central non-rotating axle, (12) the diameter of the inner wheel rim surface is sized so that when the motor is operating and regions of the flexible rotor are being magnetically pulled against the stator surface, the rotor arches that spring away from the stator surface come into solid contact with the inner cylindrical surface of the wheel rim, (13) the inner surface of the wheel rim onto which the flexible rotor comes in contact, and the outer surface of the flexible rotor contacting the inner surface of the wheel rim, are each coated with a non-slip material so that as the flexible rotor is force-wrapped forward, regions of the rotor arches in contact with the inner surface of the wheel rim rotate the wheel rim.

4. The apparatus of claim 1 in which the flexible rotor is used to turn a central rotating axle via direct rolling contact with a rotating drum fastened to said axle, where: (14) a concave stator is employed so that the working surface of the stator faces inward, (15) the concave working surface of the stator surrounds the flexible rotor which has a smaller circumference than the stator, (16) a drum with a cylindrical outer surface and the width of the flexible rotor band is surrounded by the flexible rotor and stator, (17) the drum is locked to the central rotating axle, a cylindrical casing surrounding the apparatus supports the stator, and bearings centered in the disc-shaped ends of this casing support the rotating axle, (18) in operation when regions of the flexible rotor are magnetically pulled against the stator surface, regions of the rotor stretching between rotor stator contact regions pull away from the stator surface and into solid contact with the outer cylindrical surface of the drum, (19) the outer cylindrical surface of the drum onto which the flexible rotor comes in contact, and the inner surface of the flexible rotor contacting the outer surface of the drum, are each coated with a non-slip material so that as regions of the flexible rotor come into contact with areas on the outer surface of the drum, the drum is forced to rotate with the flexible rotor as said flexible rotor is force-wrapped around the inner surface of the stator.

5. The apparatus of claim 1 in which the flexible rotor having a direction of rotation is used to turn a surrounding wheel via the use of rods and slotted wheel-hub discs, where: (20) a convex stator is employed so that the working surface of the stator faces outward, (21) the flexible rotor circumscribes the outward-facing working surface of the stator with a circumference that is greater than the stator circumference, (22) half-round rods are welded to the flexible rotor at regular intervals oriented perpendicular to the direction of rotation of the rotor, (23) the ends of these rods extend past the edges of the flexible rotor and rigid disc-shaped caps are firmly attached to and cover the ends of these rods to provide a fully-round shape to the ends of the rods, (24) said disc-shaped caps fit into radial slots cut into a pair of rotating wheel-hub discs positioned on either side of the rotor and stator, (25) said pair of rotating wheel-hub discs support a cylindrical wheel rim where said wheel rim having a combined diameter forms a cylinder surrounding the rotor and stator that bridges the gap between the outside circumferences of these two discs so that they are solidly connected as a single rotating structural component onto which a wheel is mounted and supported by this structure, (26) the inner diameter of this wheel rim is dimensioned so that the rotor never contacts the inner surface of this wheel rim, (27) the stator is locked to a central non-rotating axle and each rotating wheel-hub disc is supported by a bearing ring that turns freely about said fixed central axle, (28) the radial slots in said discs, and the disc-shaped rod caps that fit into these slots, are each coated with a highly slippery material to allow friction-free movement of the rods as the flexible rotor springs away from the stator surface when magnetic forces release said rotor and when said rotor is pulled back to the stator surface by magnetic forces, (29) as the flexible rotor rotates around the stator the rods with their round slippery end caps push on the sides of the slots applying a rotating force to the wheel-hub discs and thus the wheel.

6. The apparatus of claim 1 in which the flexible rotor having a directional rotation is used to turn a central rotating axle via the use of rotor rods and slotted discs fastened to a central rotating axle, where (14) a concave stator is employed with the working surface of the stator facing inward, (15) the concave working surface of the stator surrounds the flexible rotor which has a smaller circumference than the stator, (22) half-round rods are welded to the flexible rotor at regular intervals oriented perpendicular to the direction of rotation of the rotor (23) the ends of these rods extend past the edges of the flexible rotor and rigid disc-shaped caps are firmly attached to and cover the ends of these rods to provide a fully-round shape to the ends of the rods, (30) said disc-shaped caps fit into radial slots cut into a pair of rotating discs positioned immediately adjacent to and on either side of the rotor, (31) said discs are firmly attached to the central rotating axle, (32) a cylindrical casing surrounding the apparatus supports the stator, and bearings centered in the disc-shaped ends of this casing support the rotating axle, (33) the radial slots in these discs, and the disc-shaped rod caps that fit into these slots, are each coated with a highly slippery material to allow friction-free movement of the rods as the flexible rotor springs away from the stator surface when magnetic forces release it and when it is pulled back to the stator surface by magnetic forces, and (34) as the flexible rotor rotates around the stator the rods with their round slippery end caps push on the sides of the slots applying a rotating force to the discs that turn the central axle.

7. The apparatus of claim 1 in which the flexible rotor is used for the generation of electrical power comprising: (35) separator-lifter assemblies the width of the flexible rotor that are comprised of a beveled bar at the leading edge followed by rollers that respectively separate and then lift the flexible rotor away from the stator surface as each assembly sweeps forward around the stator surface between the rotor and stator, the number and spacing of said assemblies around the stator surface matching the number and spacing of rotor-stator contact regions, (36) a central rotating shaft that is turned by external mechanical forces to generate electrical power, (37) paired radial arm assemblies securely fastened to the central rotating shaft with one radial arm assembly of the pair on each side of the rotor having arms extending from the shaft to a radius approximately equal to that of the stator with the radial arms on either side of the rotor equal in number to the number of separator-lifter assemblies and spaced to match the locations of the separator-lifter assemblies, (38) a bracket on either side of each separator-lifter assembly that holds in place the beveled-edge bar and bearings for the rollers of the assembly and which fastens to the matching radial arms on either side of the rotor; the beveled-bar leading edge of each assembly is coated with a slippery substance, so that when the radial arms are turned by the central shaft and the beveled edge is pushed forward to separate the flexible rotor from the stator surface, so that the flexible rotor easily slides up and over this beveled edge; after this leading beveled edge slides between the flexible rotor and stator a succession of non-metallic rollers roll under and continue to lift the flexible rotor away from the stator surface until the flexible rotor has been lifted a significant distance from the stator surface; past this point additional rollers allow the flexible rotor to gently return to the stator surface over a distance equal to the arch length of the flexible rotor.

8. A method for electrical power generation and motor regeneration employing the flexible rotor of claim 1 wherein:
(1A) when an external force begins wrapping the rotor around the stator, the electronic controller detects this movement and begins monitoring the position of the flexible rotor (2A) as rotor contact regions with the stator are wrapped forward and first come into contact with the edges of a set of actuators then a calculated amount of seed current is injected by the controller into said set of actuators via the controller connecting said set of actuators to a power supply or battery, (3A) when said rotor contact regions continue to be wrapped forward by the external force to a position where they are centered over these same actuators, then the controller disconnects the windings of these actuators from the power supply and immediately connects them to the output terminals of the generator to provide power out to either a storage device or inverter to provide ac line current, (4A) as rotor-stator contact regions continue to be wrapped forward by the external force they roll further along the stator surface and out of direct contact with the magnetic elements of these active actuators and in turn rotor arches begin to rise over each of the active actuators which increases the magnetic reluctance of each actuator by orders of magnitude, (5A) this increased magnetic reluctance causes the magnetic field of each actuator to expand which induces a large voltage on the active actuator windings which in turn drives a large amount of electrical current into either a storage device or power line, (6A) the induced voltage and current return to zero when the rotor arches move to a point where they are centered over the active actuators at which point the magnetic reluctance of the active actuators reach their maximum value, (7A) a multi-phase arrangement of actuators is used to provide continuous output of power so that as the power produced by one set of actuators begins to drop towards zero another set of actuators has been activated and is generating power in like fashion, (8A) a current-forwarding method is used to seed calculated amounts of current into sequential sets of actuators when the flexible rotor's regions of contact are wrapped forward and into contact with the magnetic material between one set of actuators and the next and in this way eliminate the need for a battery or other power source to inject seed current into the actuators once the generation process has been initiated;

maintaining desired generator speed by adjusting the magnitude of the magnetic forces that must be overcome by the external force turning the generator, wherein matching the external force will keep the generator turning at the current speed while decreasing the magnetic forces will cause the generator to speed up and increasing the magnetic forces will cause the generator to slow down; as the magnitude of the magnetic forces is proportional to the amount of seed current injected into each set of actuators, employing the controller to maintain speed control of the generator by continuously monitoring generator speed and either increasing or decreasing the amount of seed current injected when speed departs from a target speed desired for generator operation.

9. The method of claim 8 and further comprising current injection control wherein the amount of seed current injected is controlled by adjusting the time at which this function is activated by the controller and maximum current transfer is achieved when the rotor stator contact region is centered midway between neighboring actuators to define an optimal point and lesser amounts of current are transferred when current-forwarding is activated after the rotor stator contact region has moved forward from said optimal point.

10. The method of claim 9 further comprising adjusting the magnitude of regenerative braking in a flexible rotor motor by using said method of current injection control.

* * * * *